United States Patent
Kinjo et al.

(10) Patent No.: US 11,223,311 B2
(45) Date of Patent: Jan. 11, 2022

(54) ROTARY ELECTRIC MACHINE AND ROTARY ELECTRIC MACHINE SYSTEM

(71) Applicant: DENSO CORPORATION, Kariya (JP)

(72) Inventors: Hirofumi Kinjo, Nisshin (JP); Toru Wakimoto, Nisshin (JP); Makoto Taniguchi, Kariya (JP); Keiji Kondo, Kariya (JP); Jun Ishida, Kariya (JP); Tomoya Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/598,753

(22) Filed: Oct. 10, 2019

(65) Prior Publication Data

US 2020/0052638 A1  Feb. 13, 2020

Related U.S. Application Data

(63) Continuation of application No. PCT/JP2018/012166, filed on Mar. 26, 2018.

(30) Foreign Application Priority Data

Apr. 10, 2017  (JP) .............................. JP2017-077831

(51) Int. Cl.
*H02P 6/12* (2006.01)
*H02P 23/08* (2006.01)
(Continued)

(52) U.S. Cl.
CPC ............... *H02P 25/20* (2013.01); *H02K 3/28* (2013.01); *H02K 17/14* (2013.01); *H02P 25/22* (2013.01); *H02K 2213/03* (2013.01)

(58) Field of Classification Search
CPC ................................ H02K 3/28; H02K 16/02
See application file for complete search history.

(56) References Cited

U.S. PATENT DOCUMENTS

| 2009/0230806 A1* | 9/2009 | Miyata | H02K 19/22 310/195 |
|---|---|---|---|
| 2016/0172918 A1* | 6/2016 | Hirotani | H02K 1/165 310/198 |

(Continued)

FOREIGN PATENT DOCUMENTS

JP  2015-226425 A  12/2015

*Primary Examiner* — Kawing Chan
*Assistant Examiner* — Charles S Laughlin
(74) *Attorney, Agent, or Firm* — Oliff PLC

(57) ABSTRACT

In a rotary electric machine, a rotor, and a stator. The stator includes slots provided in a circumferential direction thereof, and stator windings wound in the slots. The stator windings include n groups of three-phase windings, where n is a power of 2. The slots include first slots each accommodating portions of same-group and same-phase windings in the n groups of three-phase windings. The energizing directions of the same-group and same-phase windings are identical to each other. The second slots each accommodate different-group and same-phase windings in the n groups of three-phase windings. The first slots and the second slots are arranged in the stator at predetermined intervals in a circumferential direction of the stator, and the three-phase windings of each group are wound around the stator with regular intervals therebetween.

9 Claims, 36 Drawing Sheets

(51) Int. Cl.
*H02P 25/20* (2006.01)
*H02K 3/28* (2006.01)
*H02K 17/14* (2006.01)
*H02P 25/22* (2006.01)

(56) References Cited

U.S. PATENT DOCUMENTS

2016/0276889 A1\* 9/2016 Ramamoorthy ....... H02K 17/12
2017/0353071 A1\* 12/2017 Saito ..................... H02K 3/12

\* cited by examiner

FIG.26

<16 pole>

| SLOT | OUTER CIRCUMFERENTIAL SIDE | INNER CIRCUMFERENTIAL SIDE | SLOT | OUTER CIRCUMFERENTIAL SIDE | INNER CIRCUMFERENTIAL SIDE |
|---|---|---|---|---|---|
| #1 | U1 | U1 | #25 | U4 | U4 |
| #2 | W3 | W4 | #26 | W2 | W1 |
| #3 | V3 | V4 | #27 | V2 | V1 |
| #4 | U2 | U1 | #28 | U3 | U4 |
| #5 | W2 | W3 | #29 | W3 | W2 |
| #6 | V4 | V3 | #30 | V1 | V2 |
| #7 | U1 | U2 | #31 | U4 | U3 |
| #8 | W1 | W2 | #32 | W4 | W3 |
| #9 | V4 | V4 | #33 | V1 | V1 |
| #10 | U2 | U1 | #34 | U3 | U4 |
| #11 | W2 | W1 | #35 | W3 | W4 |
| #12 | V3 | V4 | #36 | V2 | V1 |
| #13 | U3 | U2 | #37 | U2 | U3 |
| #14 | W1 | W2 | #38 | W4 | W3 |
| #15 | V4 | V3 | #39 | V1 | V2 |
| #16 | U4 | U3 | #40 | U1 | U2 |
| #17 | W1 | W1 | #41 | W4 | W4 |
| #18 | V3 | V4 | #42 | V2 | V1 |
| #19 | U3 | U4 | #43 | U2 | U1 |
| #20 | W2 | W1 | #44 | W3 | W4 |
| #21 | V2 | V3 | #45 | V3 | V2 |
| #22 | U4 | U3 | #46 | U1 | U2 |
| #23 | W1 | W2 | #47 | W4 | W3 |
| #24 | V1 | V2 | #48 | V4 | V3 |

FIG.27

<4 pole>

| SLOT | OUTER CIRCUMFERENTIAL SIDE | INNER CIRCUMFERENTIAL SIDE | SLOT | OUTER CIRCUMFERENTIAL SIDE | INNER CIRCUMFERENTIAL SIDE |
|---|---|---|---|---|---|
| #1 | U1 | U1 | #25 | U4 | U4 |
| #2 | W3 | W4 | #26 | W2 | W1 |
| #3 | V3 | V4 | #27 | V2 | V1 |
| #4 | U2 | U1 | #28 | U3 | U4 |
| #5 | W2 | W3 | #29 | W3 | W2 |
| #6 | V4 | V3 | #30 | V1 | V2 |
| #7 | U1 | U2 | #31 | U4 | U3 |
| #8 | W1 | W2 | #32 | W4 | W3 |
| #9 | V4 | V4 | #33 | V1 | V1 |
| #10 | U2 | U1 | #34 | U3 | U4 |
| #11 | W2 | W1 | #35 | W3 | W4 |
| #12 | V3 | V4 | #36 | V2 | V1 |
| #13 | U3 | U2 | #37 | U2 | U3 |
| #14 | W1 | W2 | #38 | W4 | W3 |
| #15 | V4 | V3 | #39 | V1 | V2 |
| #16 | U4 | U3 | #40 | U1 | U2 |
| #17 | W1 | W1 | #41 | W4 | W4 |
| #18 | V3 | V4 | #42 | V2 | V1 |
| #19 | U3 | U4 | #43 | U2 | U1 |
| #20 | W2 | W1 | #44 | W3 | W4 |
| #21 | V2 | V3 | #45 | V3 | V2 |
| #22 | U4 | U3 | #46 | U1 | U2 |
| #23 | W1 | W2 | #47 | W4 | W3 |
| #24 | V1 | V2 | #48 | V4 | V3 |

FIG.28

⟨2 pole⟩

| SLOT | OUTER CIRCUMFERENTIAL SIDE | INNER CIRCUMFERENTIAL SIDE | SLOT | OUTER CIRCUMFERENTIAL SIDE | INNER CIRCUMFERENTIAL SIDE |
|---|---|---|---|---|---|
| #1 | U1 | U1 | #25 | U4 | U4 |
| #2 | W3 | W4 | #26 | W2 | W1 |
| #3 | V3 | V4 | #27 | V2 | V1 |
| #4 | U2 | U1 | #28 | U3 | U4 |
| #5 | W2 | W3 | #29 | W3 | W2 |
| #6 | V4 | V3 | #30 | V1 | V2 |
| #7 | U1 | U2 | #31 | U4 | U3 |
| #8 | W1 | W2 | #32 | W4 | W3 |
| #9 | V4 | V4 | #33 | V1 | V1 |
| #10 | U2 | U1 | #34 | U3 | U4 |
| #11 | W2 | W1 | #35 | W3 | W4 |
| #12 | V3 | V4 | #36 | V2 | V1 |
| #13 | U3 | U2 | #37 | U2 | U3 |
| #14 | W1 | W2 | #38 | W4 | W3 |
| #15 | V4 | V3 | #39 | V1 | V2 |
| #16 | U4 | U3 | #40 | U1 | U2 |
| #17 | W1 | W1 | #41 | W4 | W4 |
| #18 | V3 | V4 | #42 | V2 | V1 |
| #19 | U3 | U4 | #43 | U2 | U1 |
| #20 | W2 | W1 | #44 | W3 | W4 |
| #21 | V2 | V3 | #45 | V3 | V2 |
| #22 | U4 | U3 | #46 | U1 | U2 |
| #23 | W1 | W2 | #47 | W4 | W3 |
| #24 | V1 | V2 | #48 | V4 | V3 |

FIG.30

<16 pole>

| SLOT | OUTER CIRCUMFERENTIAL SIDE | INNER CIRCUMFERENTIAL SIDE | SLOT | OUTER CIRCUMFERENTIAL SIDE | INNER CIRCUMFERENTIAL SIDE |
|---|---|---|---|---|---|
| #1 | U1 | U1 | #25 | U8 | U8 |
| #2 | W5 | W6 | #26 | W4 | W3 |
| #3 | V7 | V6 | #27 | V2 | V3 |
| #4 | U2 | U1 | #28 | U7 | U8 |
| #5 | W4 | W5 | #29 | W5 | W4 |
| #6 | V8 | V7 | #30 | V1 | V2 |
| #7 | U3 | U2 | #31 | U6 | U7 |
| #8 | W3 | W4 | #32 | W6 | W5 |
| #9 | V8 | V8 | #33 | V1 | V1 |
| #10 | U4 | U3 | #34 | U5 | U6 |
| #11 | W2 | W3 | #35 | W7 | W6 |
| #12 | V7 | V8 | #36 | V2 | V1 |
| #13 | U5 | U4 | #37 | U4 | U5 |
| #14 | W1 | W2 | #38 | W8 | W7 |
| #15 | V6 | V7 | #39 | V3 | V2 |
| #16 | U6 | U5 | #40 | U3 | U4 |
| #17 | W1 | W1 | #41 | W8 | W8 |
| #18 | V5 | V6 | #42 | V4 | V3 |
| #19 | U7 | U6 | #43 | U2 | U3 |
| #20 | W2 | W1 | #44 | W7 | W8 |
| #21 | V4 | V5 | #45 | V5 | V4 |
| #22 | U8 | U7 | #46 | U1 | U2 |
| #23 | W3 | W2 | #47 | W6 | W7 |
| #24 | V3 | V4 | #48 | V6 | V5 |

FIG.31

⟨8 pole⟩

| SLOT | OUTER CIRCUMFERENTIAL SIDE | INNER CIRCUMFERENTIAL SIDE | SLOT | OUTER CIRCUMFERENTIAL SIDE | INNER CIRCUMFERENTIAL SIDE |
|---|---|---|---|---|---|
| #1 | U1 | U1 | #25 | U8 | U8 |
| #2 | W5 | W6 | #26 | W4 | W3 |
| #3 | V7 | V6 | #27 | V2 | V3 |
| #4 | U2 | U1 | #28 | U7 | U8 |
| #5 | W4 | W5 | #29 | W5 | W4 |
| #6 | V8 | V7 | #30 | V1 | V2 |
| #7 | U3 | U2 | #31 | U6 | U7 |
| #8 | W3 | W4 | #32 | W6 | W5 |
| #9 | V8 | V8 | #33 | V1 | V1 |
| #10 | U4 | U3 | #34 | U5 | U6 |
| #11 | W2 | W3 | #35 | W7 | W6 |
| #12 | V7 | V8 | #36 | V2 | V1 |
| #13 | U5 | U4 | #37 | U4 | U5 |
| #14 | W1 | W2 | #38 | W8 | W7 |
| #15 | V6 | V7 | #39 | V3 | V2 |
| #16 | U6 | U5 | #40 | U3 | U4 |
| #17 | W1 | W1 | #41 | W8 | W8 |
| #18 | V5 | V6 | #42 | V4 | V3 |
| #19 | U7 | U6 | #43 | U2 | U3 |
| #20 | W2 | W1 | #44 | W7 | W8 |
| #21 | V4 | V5 | #45 | V5 | V4 |
| #22 | U8 | U7 | #46 | U1 | U2 |
| #23 | W3 | W2 | #47 | W6 | W7 |
| #24 | V3 | V4 | #48 | V6 | V5 |

FIG.32

<4 pole>

| SLOT | OUTER CIRCUMFERENTIAL SIDE | INNER CIRCUMFERENTIAL SIDE | SLOT | OUTER CIRCUMFERENTIAL SIDE | INNER CIRCUMFERENTIAL SIDE |
|---|---|---|---|---|---|
| #1 | U1 | __U1__ | #25 | U8 | __U8__ |
| #2 | W5 | __W6__ | #26 | W4 | __W3__ |
| #3 | __V7__ | V6 | #27 | __V2__ | V3 |
| #4 | U2 | __U1__ | #28 | U7 | __U8__ |
| #5 | __W4__ | __W5__ | #29 | __W5__ | __W4__ |
| #6 | __V8__ | V7 | #30 | __V1__ | V2 |
| #7 | U3 | __U2__ | #31 | U6 | __U7__ |
| #8 | __W3__ | W4 | #32 | __W6__ | W5 |
| #9 | __V8__ | __V8__ | #33 | __V1__ | __V1__ |
| #10 | U4 | __U3__ | #34 | U5 | __U6__ |
| #11 | __W2__ | W3 | #35 | __W7__ | W6 |
| #12 | V7 | __V8__ | #36 | V2 | __V1__ |
| #13 | __U5__ | __U4__ | #37 | __U4__ | __U5__ |
| #14 | __W1__ | W2 | #38 | __W8__ | W7 |
| #15 | V6 | __V7__ | #39 | V3 | __V2__ |
| #16 | __U6__ | U5 | #40 | __U3__ | U4 |
| #17 | __W1__ | __W1__ | #41 | __W8__ | __W8__ |
| #18 | V5 | __V6__ | #42 | V4 | __V3__ |
| #19 | __U7__ | U6 | #43 | __U2__ | U3 |
| #20 | W2 | __W1__ | #44 | W7 | __W8__ |
| #21 | __V4__ | __V5__ | #45 | __V5__ | __V4__ |
| #22 | __U8__ | U7 | #46 | __U1__ | U2 |
| #23 | W3 | __W2__ | #47 | W6 | __W7__ |
| #24 | __V3__ | V4 | #48 | __V6__ | V5 |

FIG.33

<2 pole>

| SLOT | OUTER CIRCUMFERENTIAL SIDE | INNER CIRCUMFERENTIAL SIDE | SLOT | OUTER CIRCUMFERENTIAL SIDE | INNER CIRCUMFERENTIAL SIDE |
|---|---|---|---|---|---|
| #1 | U1 | U1 | #25 | U8 | U8 |
| #2 | <u>W5</u> | W6 | #26 | W4 | <u>W3</u> |
| #3 | V7 | <u>V6</u> | #27 | <u>V2</u> | V3 |
| #4 | U2 | <u>U1</u> | #28 | <u>U7</u> | U8 |
| #5 | <u>W4</u> | W5 | #29 | W5 | <u>W4</u> |
| #6 | V8 | <u>V7</u> | #30 | <u>V1</u> | V2 |
| #7 | U3 | <u>U2</u> | #31 | <u>U6</u> | U7 |
| #8 | <u>W3</u> | W4 | #32 | W6 | <u>W5</u> |
| #9 | <u>V8</u> | V8 | #33 | V1 | V1 |
| #10 | U4 | <u>U3</u> | #34 | <u>U5</u> | U6 |
| #11 | <u>W2</u> | W3 | #35 | W7 | <u>W6</u> |
| #12 | <u>V7</u> | V8 | #36 | V2 | <u>V1</u> |
| #13 | U5 | <u>U4</u> | #37 | <u>U4</u> | U5 |
| #14 | <u>W1</u> | W2 | #38 | W8 | <u>W7</u> |
| #15 | <u>V6</u> | V7 | #39 | V3 | <u>V2</u> |
| #16 | U6 | <u>U5</u> | #40 | <u>U3</u> | U4 |
| #17 | W1 | W1 | #41 | <u>W8</u> | <u>W8</u> |
| #18 | <u>V5</u> | V6 | #42 | V4 | <u>V3</u> |
| #19 | U7 | <u>U6</u> | #43 | <u>U2</u> | U3 |
| #20 | W2 | <u>W1</u> | #44 | <u>W7</u> | W8 |
| #21 | <u>V4</u> | V5 | #45 | V5 | <u>V4</u> |
| #22 | U8 | <u>U7</u> | #46 | <u>U1</u> | U2 |
| #23 | W3 | <u>W2</u> | #47 | <u>W6</u> | W7 |
| #24 | <u>V3</u> | V4 | #48 | V6 | <u>V5</u> |

FIG.36
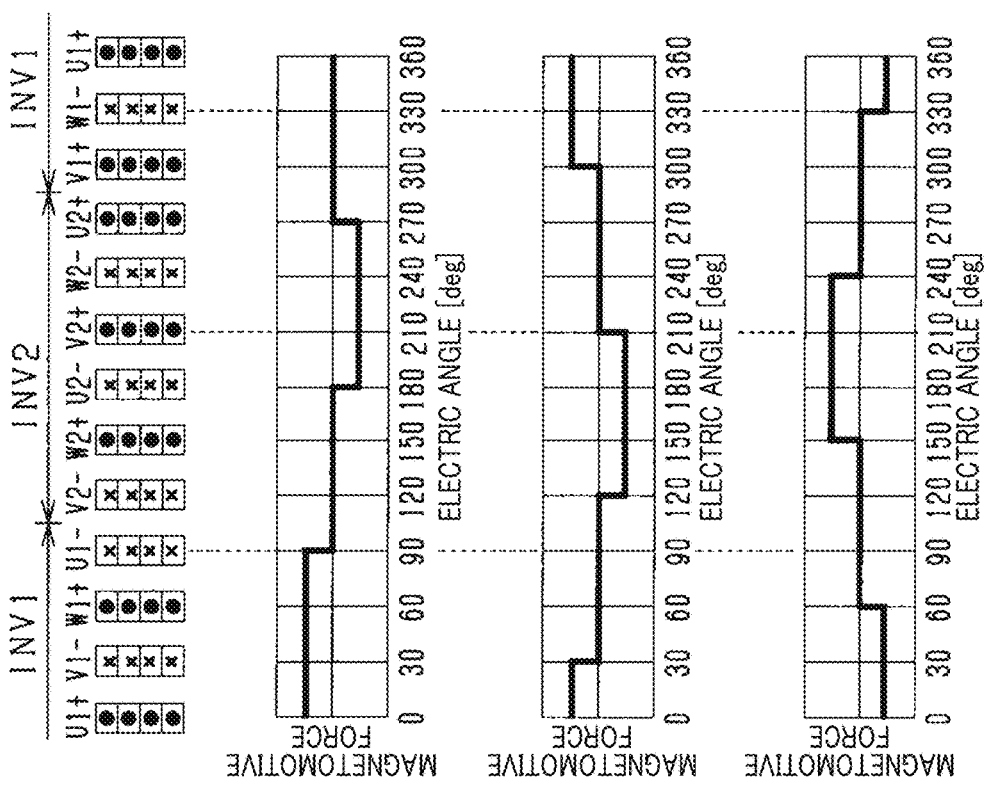
(a) PRESENT DISCLOSURE
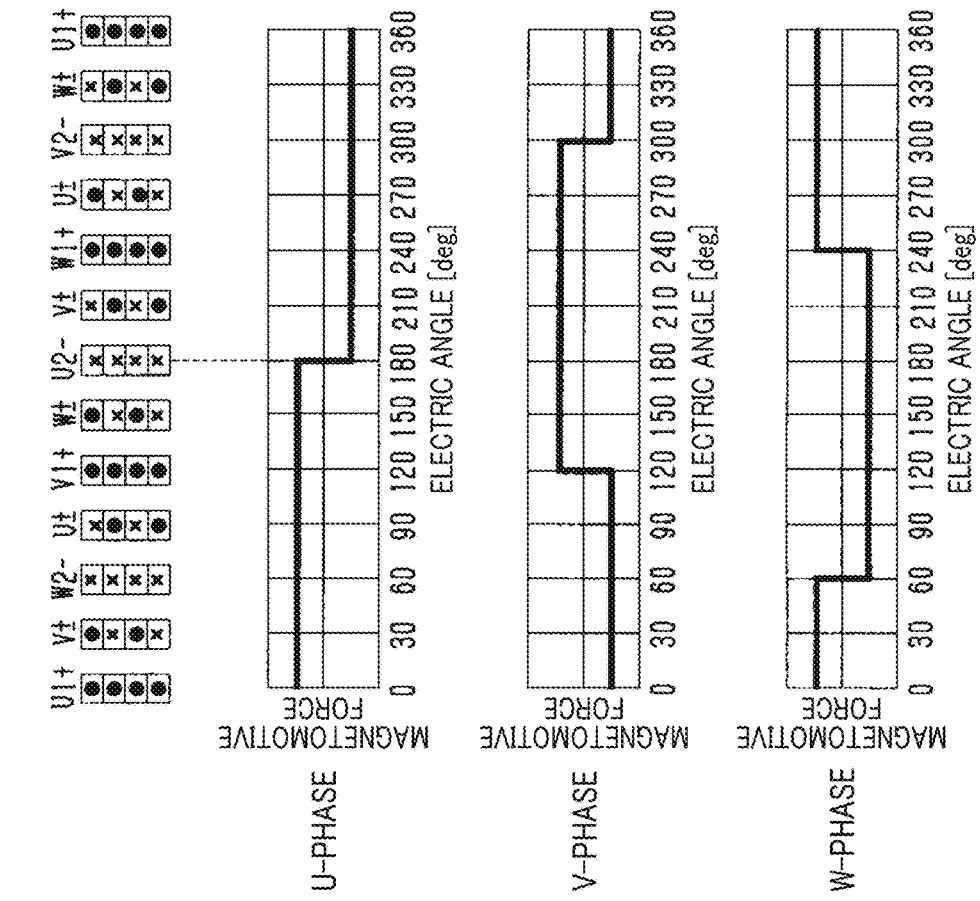
(b) CONVENTIONAL TECHNIQUE FIG.37
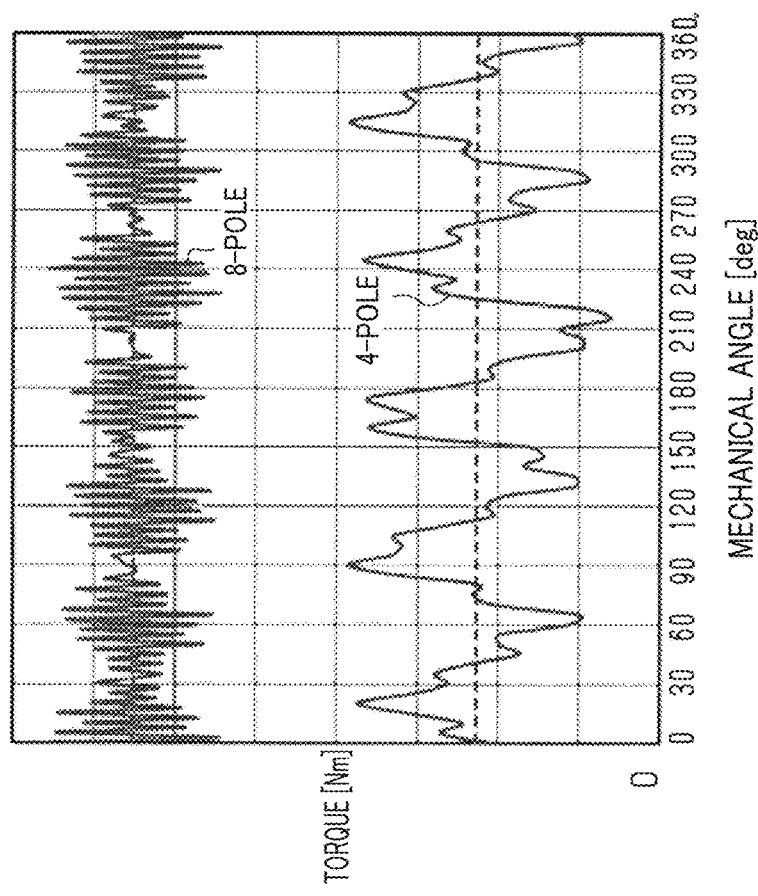
(a) PRESENT DISCLOSURE
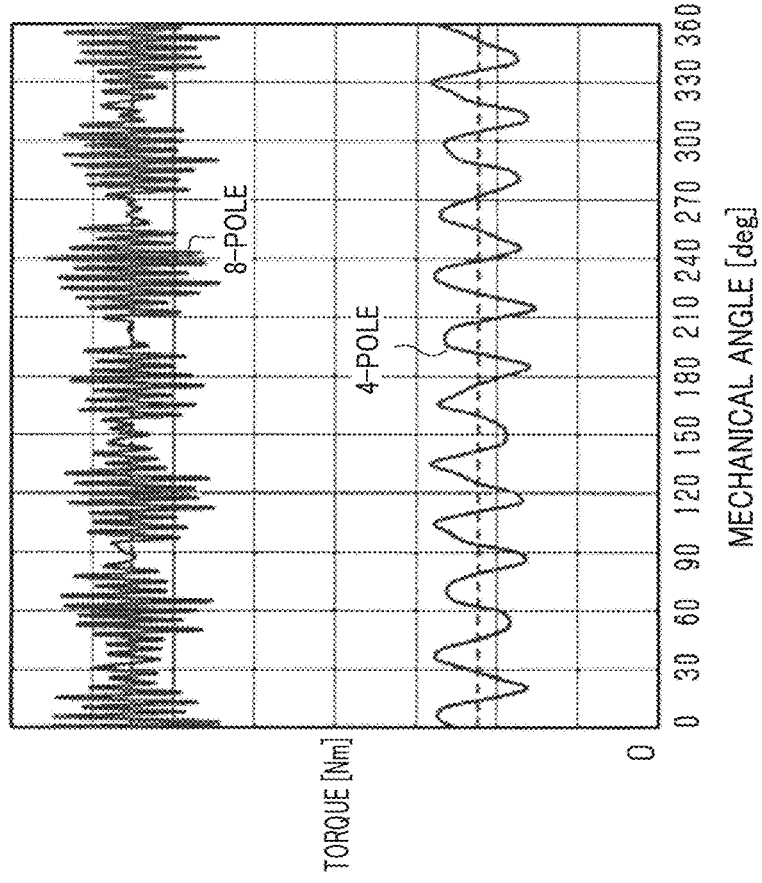
(b) CONVENTIONAL TECHNIQUE FIG.38
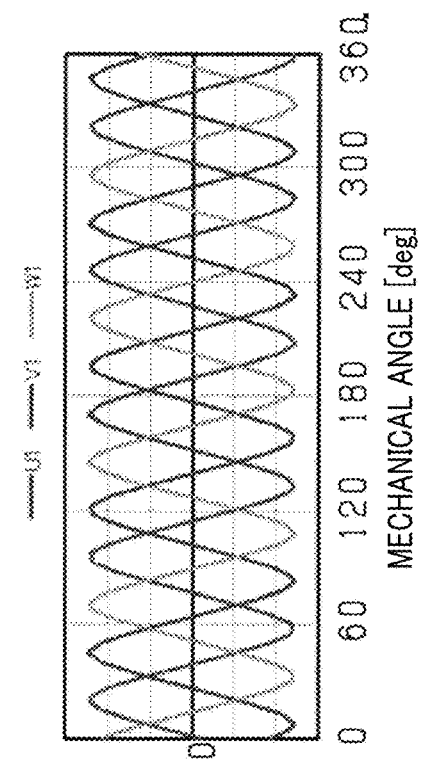
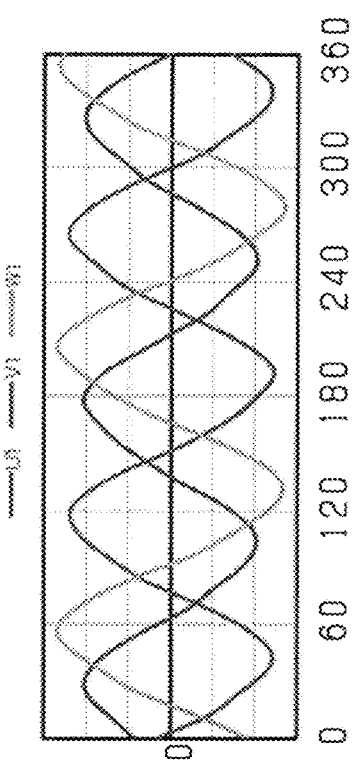
(a) PRESENT DISCLOSURE
(b) CONVENTIONAL TECHNIQUE
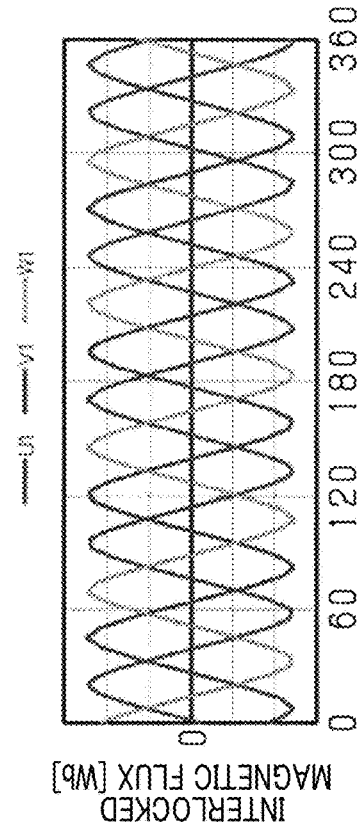
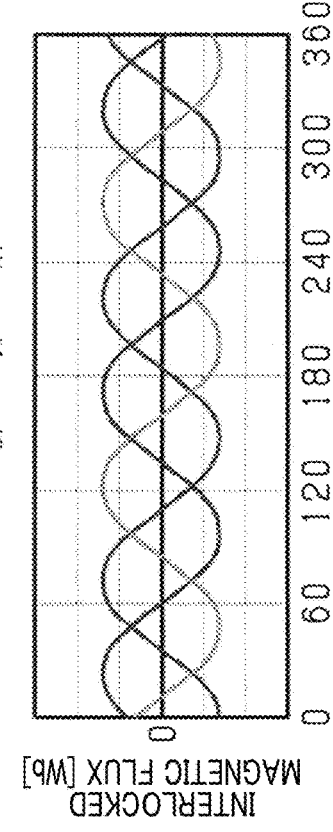

FIG.39
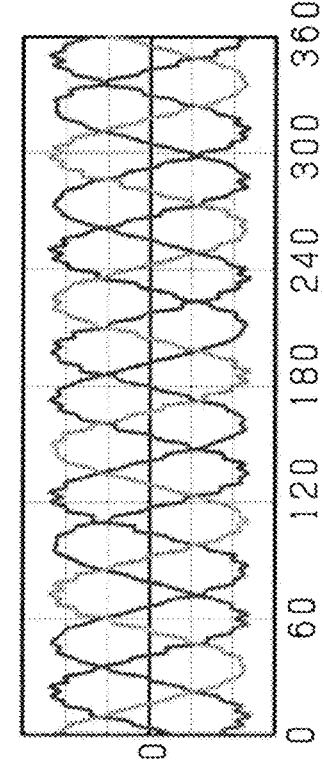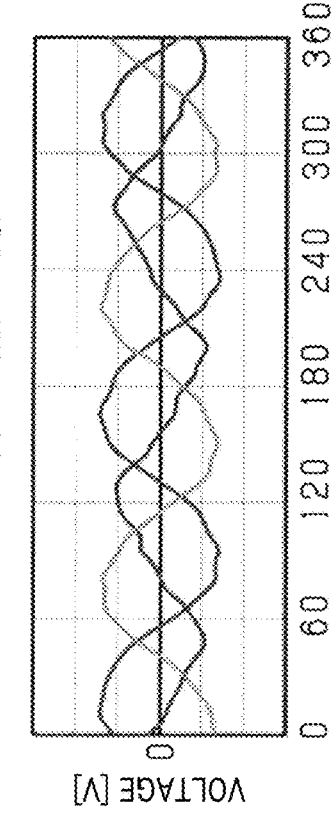
(a) PRESENT DISCLOSURE
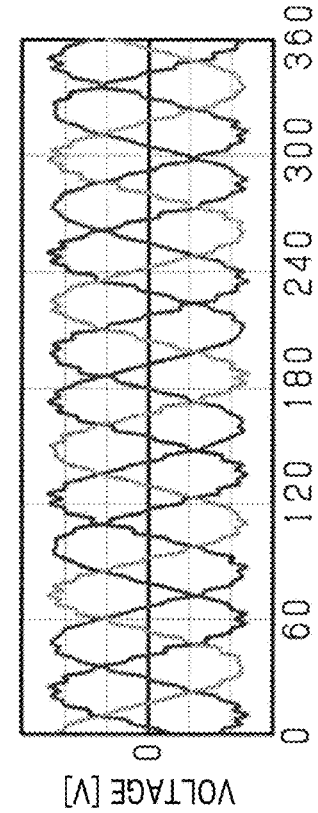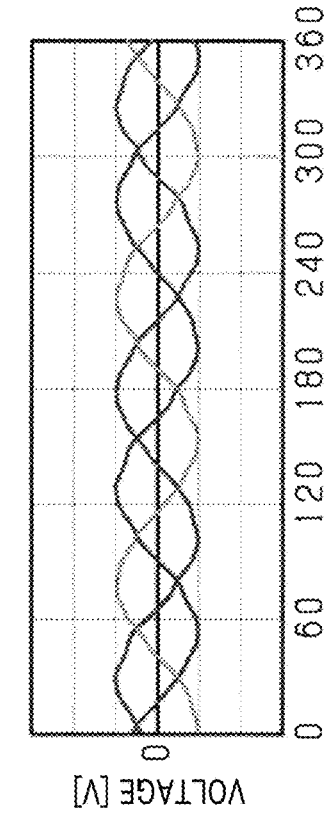
(b) CONVENTIONAL TECHNIQUE FIG.40
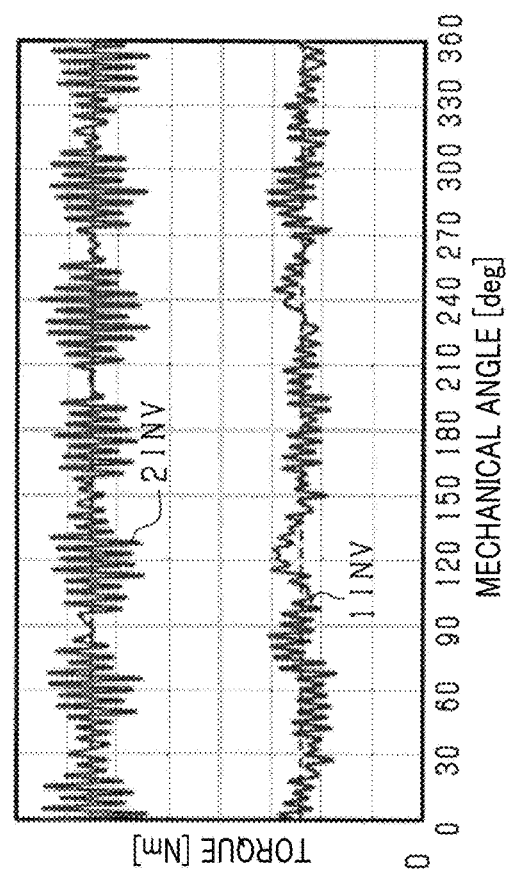
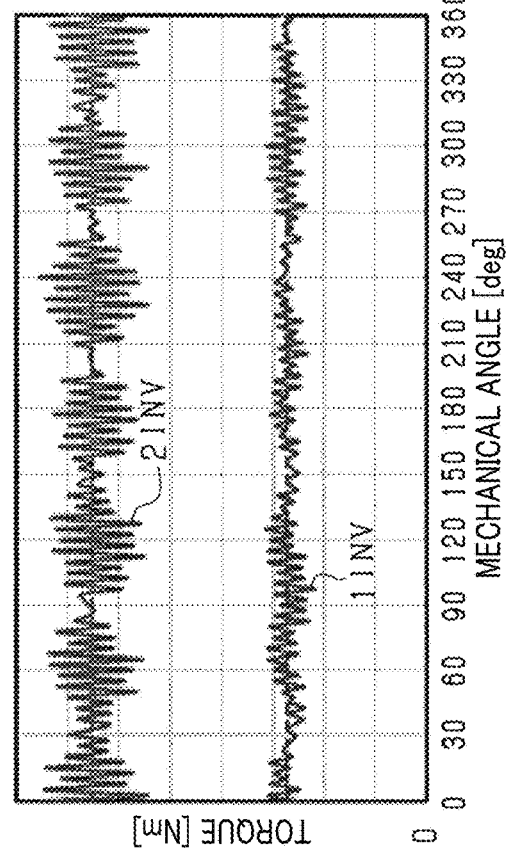

US 11,223,311 B2

ROTARY ELECTRIC MACHINE AND ROTARY ELECTRIC MACHINE SYSTEM

CROSS-REFERENCE TO RELATED APPLICATIONS

This application is based on and claims the benefit of priority from Japanese Patent Application No. 2017-077831 filed on Apr. 10, 2017, the entire disclosure of which is incorporated herein by reference.

TECHNICAL FIELD

The present disclosure relates to a rotary electric machine driven based on an adjustable speed, and a rotary electric machine system including such a rotary electric machine.

BACKGROUND

Conventionally, a pole-number switching rotary electric machine has been proposed as a rotary electric machine driven based on an adjustable speed.

SUMMARY

In a rotary electric machine, slots include first slots each accommodating portions of same-group and same-phase windings in the n groups of three-phase windings. Energizing directions of the same-group and same-phase windings are identical to each other. The slots include second slots each accommodating different-group and same-phase windings in the n groups of three-phase windings. The first slots and the second slots are arranged in the stator at predetermined intervals in a circumferential direction of the stator, and the three-phase windings of each group are wound around the stator with regular intervals therebetween.

BRIEF DESCRIPTION OF THE DRAWINGS

The object above and other objects, features and advantages of the present disclosure will become more apparent from the following detailed description with reference to the accompanying drawings. In those drawings:

FIG. 26 is a diagram showing an energization pattern in a 16-pole mode,
FIG. 27 is a diagram showing an energization pattern in a 4-pole mode,
FIG. 28 is a diagram showing an energization pattern in a 2-pole mode,
FIG. 30 is a diagram showing an energization pattern in a 16-pole mode,
FIG. 31 is a diagram showing an energization pattern in an 8-pole mode,
FIG. 32 is a diagram showing an energization pattern in a 4-pole mode,
FIG. 33 is a diagram showing an energization pattern in a 2-pole mode,
FIG. 36 is a diagram showing a magnetomotive force distribution for the present disclosure and for a conventional technique,
FIG. 37 is a diagram showing torque characteristics for the present disclosure and for a conventional technique,
FIG. 38 is a diagram showing an interlocked magnetic flux for the present disclosure and for the conventional technique,
FIG. 39 is a diagram showing phase voltages for the present disclosure and for the conventional technique,
and
FIG. 40 is a diagram showing the torque when inverters are driven in the present disclosure and in the conventional technique.

DESCRIPTION OF EMBODIMENTS

Viewpoint of Present Disclosure

Figure 1:
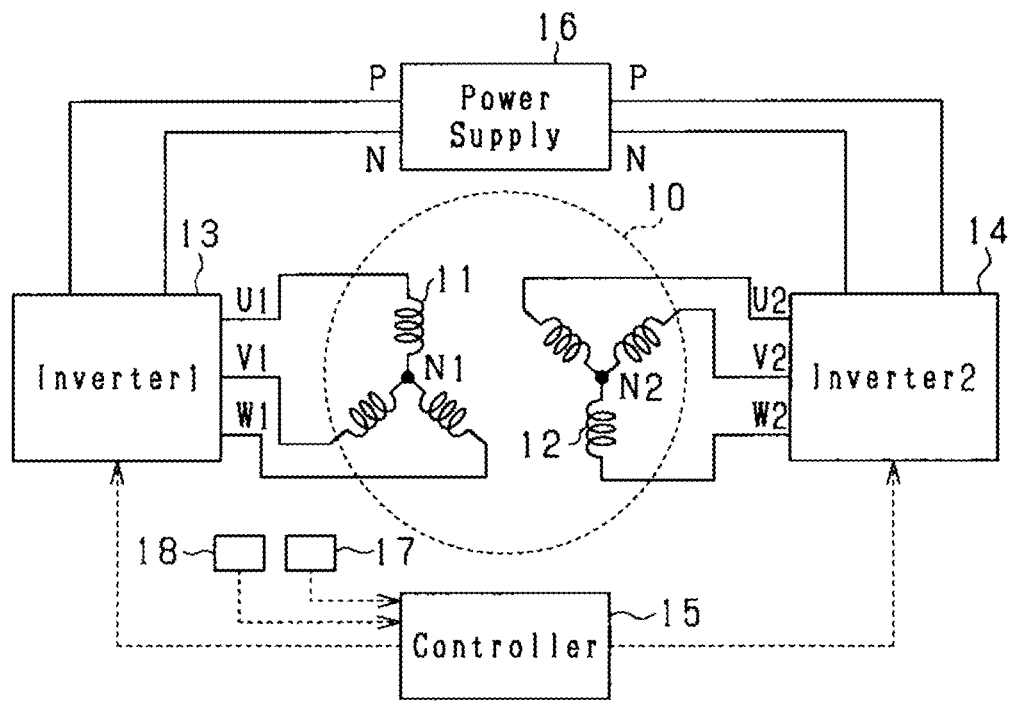
FIG. 1 is an overall configuration diagram of a rotary electric machine system.

For example, Japanese Patent Application Publication No. 2015-226425A discloses such a pole-number switchable induction machine. The disclosed induction machine is configured such that a first group of distributedly wound three-phase stator windings and a second group of distributedly wound three-phase stator windings are alternately connected to first and second three-phase inverters every pole pair.

The first and second three-phase inverters are configured to switch a first three-phase current flowing through the first group of three-phase stator windings and a second three-phase current flowing through the second group of three-phase stator windings between the same phase as each other and the opposite phases to each other. This enables the number of poles of the induction machine to be changed between a predetermined number and double of the predetermined number.

Because the first group of distributedly wound three-phase stator windings and the second group of distributedly wound three-phase stator windings are alternately connected to the first and second three-phase inverters every pole pair, the three-phase magnetomotive force distribution of the induction machine may become unbalanced while the number of poles of the induction machine is changed to be reduced. This may result in a specified phase voltage being higher, causing (1) The high-speed operation range of the induction machine to become limited (2) An increase of output torque ripple of the induction machine thereby deteriorating vibrations and noise generated from the induction machine For addressing the above issue, the present disclosure seems to provide (1) Rotary electric machines, each of which is designed to have a wider high-speed operation range (2) A system for appropriately driving such a rotary electric machine The following describes various aspects of the present disclosure.

A rotary electric machine according to the first aspect includes a rotor and a stator. The stator includes a plurality of slots provided in a circumferential direction thereof, and stator windings wound in the slots.

The stator windings include n groups of three-phase windings, where n is a power of 2.

The slots include first slots each accommodating portions of same-group and same-phase windings in the n groups of three-phase windings, energizing directions of the same-group and same-phase windings being identical to each other. The slots include second slots each accommodating different-group and same-phase windings in the n groups of three-phase windings. The first slots and the second slots are arranged in the stator at predetermined intervals in a circumferential direction of the stator. The three-phase windings of each group are wound around the stator with regular intervals therebetween.

The first slots each accommodates portions of same-group and same-phase windings in the n groups of three-phase windings, and energizing directions of the same-group and same-phase windings are identical to each other. This causes magnetomotive forces generated due to energization of the corresponding phase windings to be added to each other.

The second slots each accommodate different-group and same-phase windings in the n groups of three-phase windings. This causes the magnetomotive forces between the different-group and same-phase windings to be added to each other or cancel each other out depending on how each of the different-group and same-phase windings is energized.

Switching the energization directions of each of the groups of phase windings enables a first state in which the magnetomotive forces each of the second slots to be added to each other and a second state in which the magnetomotive forces are canceled each other out to be switched therebetween. This consequently enables the number of poles of the rotary electric machine to be switched. Switching of the number of poles of the rotary electric machine results in expansion of the operating range of the rotary electric machine.

In particular, because the three-phase windings of each group are wound around the stator with regular intervals therebetween, the intervals between the magnetomotive forces generated by the respective phases are identical to each other regardless of the number of poles. Consequently, torque ripples that arise due to circumferential direction imbalances in the magnetomotive forces are reduced, and reductions in vibrations and noise can be achieved. Furthermore, because variations in the phase voltages can be suppressed for the same reasons, the high-speed operating range can be further expanded.

In a rotary electric machine according to the second aspect, the first slots respectively for different groups in the n groups are arranged at intervals of m slots in the circumferential direction of the stator, and (m−1) second slots are each arranged between a corresponding pair of the first slots of the different groups.

The above configuration is configured such that the first slots are arranged at intervals of m slots in the circumferential direction of the stator, and (m−1) second slots are each arranged between a corresponding pair of the first slots of the different groups. This configuration obtains an advantage of disposing the slots in which magnetomotive force is generated, that is to say, the slots in which the energization directions of the two groups of phase windings are identical, with an equal spacing in the circumferential direction in each pole number mode of the rotary electric machine. As a result, the magnetomotive force can be generated in a well-balanced fashion in the circumferential direction, regardless of the pole number mode.

In the rotary electric machine according to the third aspect, each of the second slots accommodates the same number of the different-group and same-phase windings for each of the different groups.

This configuration enables the current amplitude to be identical for each of the phase windings regardless of the number of poles. Because the voltage and current rating of the phases of the power converter can be identical, common components can be used for the power converter, and costs can be reduced.

This enables the voltage and current rating of each phase of a first power converter to be identical to that of the corresponding phase of a second power converter, making it possible to achieve commonality of components of the first and second power converters. This results in reduction in cost of the first and second power converters.

In the rotary electric machine according to the fourth aspect, the stator windings include $2^{(A-1)}$ groups of phase windings as the n groups of phase windings, and the second slots include slots, each of the slots accommodating a unique combination of two groups of phase windings selected from the $2^{(A-1)}$ groups of phase windings. The number of poles of the rotary electric machine is configured to be changeable in the A steps.

In the rotary electric machine according to the fourth aspect, reversing the energization direction of one of the phase windings of the selected two groups disposed in at least one second slot against the energization direction of the other of the phase windings enables the number of poles of the rotary electric machine to be changeable in the A steps.

This therefore obtains a plurality of proper torque characteristics of the rotary electric machine.

In the rotary electric machine according to the fifth aspect, the n groups of phase windings are comprised of a first group to an nth group of phase windings, and the second slots include slots that accommodate, for each phase, (n−1) types of combinations of any two-different group windings selected from the first group to the nth group.

According to the fifth aspect, the two groups of phase windings accommodated in each of the second slots represent (n−1) types of combinations of any two-different group windings selected from the first group to the nth group for each phase. Appropriately energizing the phase windings of each of the second slots enables changing of the number of poles of the rotary electric machine to be easily changed.

A rotary electric machine system according to the sixth aspect includes a rotary electric machine according to the first aspect, and a controller that controls energization of each of the phase windings in the rotary electric machine. The controller includes a first energization control unit that performs energization of each of the different-phase and same-group windings accommodated in a corresponding one of the second slots such that energization directions of the respective different-phase and same-group windings are identical to each other. The controller includes a second energization control unit that performs energization of each of the different-phase and same-group windings accommodated in a corresponding one of the second slots such that energization directions of the respective different-phase and same-group windings are different from each other. The controller includes a switching unit that switches between energization of each of the different-phase and same-group windings by the first energization control unit, and energization of the each of the different-phase and same-group windings by the second energization control unit.

Switching between energization of each of the different-phase and same-group windings and energization of the each of the different-phase and same-group windings makes it possible to switch between 1. The first state in which the magnetomotive forces of the phase windings included in each first slot are added to each other and the magnetomotive forces of the phase windings included in each second slot are added to each other 2. The second state in which the magnetomotive forces of the phase windings included in each first slot are added to each other, so that the magnetomotive forces of the phase windings included in each second slot 34B are canceled each other out As a result, it is possible to appropriately switch the number of poles according to a drive request and the like with respect to the rotary electric machine.

In a rotary electric machine system according to the seventh aspect, the second slots in the rotary electric machine include slots, each of the slots accommodating a unique combination of two groups of phase windings selected from the n groups of phase windings, and the second energization control unit is configured to selectively perform 1. A first operation that causes energization directions of the phase windings disposed in at least one of the second slots among all of the second slots to be different from each other 2. A second task that causes energization directions of the phase windings in all of the second slots to be different from each other This configuration enables the number of poles of the rotary electric machine to be appropriately changed in three or more steps.

In the rotary electric machine system according to the eighth aspect, the first energization control unit is configured to perform control of the energization of each of the different-phase and same-group windings accommodated in a corresponding one of the second slots using a predetermined first number X1 of poles of the rotary electric machine. The second energization control unit is configured to, when performing control of the energization of each of the different-phase and same-group windings accommodated in a corresponding one of the second slots using a predetermined second number X2 of poles of the rotary electric machine, set an energization frequency for each of the different-phase and same-group windings to a value of 1/B, the second number X2 being expressed by the following equation:

$$X2=X1/B$$

The eighth aspect reduces the number of poles of the rotary electric machine to the value of 1/B while reducing the energization frequency for each of the different-phase and same-group windings to the value of 1/B. This therefore enables operations of the rotary electric machine to be performed at a desired rotation speed even if the electrical angle phase of a power change varies due to switching from the number of poles of the rotary electric machine to another value.

The rotary electric machine system according to the ninth aspect includes power converters provided for the respective n groups of phase windings. The controller is configured to cause each of the power converters to perform power conversion to accordingly control energization of each of the stator windings included in a corresponding one of the second slots.

This configuration of the ninth aspect enables the power converters to parallely energize the stator windings of the respective groups, making it possible to ensure redundancy for driving the rotary electric machine.

Hereinafter, the following describes effects of each rotary electric machine disclosed in the present disclosure using a conventional rotary electric machine, such as a variable pole number induction machine, which is different from the rotary electric machine of the present disclosure. Here, a pole-number switching induction machine described in Japanese Unexamined Patent Application No. 2015-226425 is assumed as the conventional rotary electric machine. That is, the pole-number switching induction machine is configured such that 1. A first group of distributedly wound three-phase stator windings and a second group of distributedly wound three-phase stator windings are alternately connected to first and second three-phase inverters every pole pair 2. The current phase difference between the first and second inverters is switched between an in-phase difference and a reverse phase difference to thereby switching the number of poles of the induction machine with the ratio of 2:1

FIG. 36 shows the difference in magnetomotive force distribution for each phase between the rotary electric machine of the present disclosure and the conventional rotary electric machine.

FIG. 37 shows a comparison result in torque waveform between the rotary electric machine of the present disclosure and the conventional rotary electric machine.

FIG. 38 shows a comparison result in interlinkage magnetic flux between the rotary electric machine of the present disclosure and the conventional rotary electric machine.

FIG. 39 shows a comparison result in each phase voltage between the rotary electric machine of the present disclosure and the conventional rotary electric machine.

FIG. 40 shows

1. A torque comparison result, i.e. a redundancy inspection result, between the rotary electric machine of the present disclosure and the conventional rotary electric machine when each of the machines is driven by a single inverter 2. A torque comparison result, i.e. a redundancy inspection result, between the rotary electric machine of the present disclosure and the conventional rotary electric machine when each of the machines is driven by two inverters In the conventional rotary electric machine, because the stator windings are alternatingly wound every pole pair, the three-phase magnetomotive force distribution becomes unbalanced when the conventional rotary electric machine is driven in a 4-pole operation in which the number of poles has been reduced.

Consequently, torque ripples may become larger as shown in FIG. 37, the amplitude of the interlinkage magnetic flux may become larger as shown in FIG. 38, and/or the amplitude of each phase voltage may become larger as shown in FIG. 39. Additionally, torque ripples may become larger when the conventional rotary electric machine is driven by a single inverter as shown in FIG. 40.

In contrast, the rotary electric machine according to the present disclosure features a reduction in torque ripples, a reduction in the amplitude of the interlinkage magnetic flux, a reduction in the amplitude of each phase voltage, and/or a reduction in torque ripples when the rotary electric machine of the present disclosure is driven by a single inverter.

EMBODIMENTS

The following describes embodiments of the present disclosure with reference to the accompanying drawings. A rotary electric machine according to each embodiment is, for example, used as a power source for a vehicle. The rotary electric machine according to each embodiment can however be broadly used in industry, vehicles, home appliances, office automation (OA) equipment, game machines, and the other various devices.

In the embodiments, like parts between the embodiments, to which like reference characters are assigned, are omitted or simplified to avoid redundant description.

First Embodiment

The following describes a rotary electric machine system according to the first embodiment of the present disclosure with reference to FIGS. 1 to 13.

As shown in FIG. 1, the rotary electric machine system includes a rotary electric machine 10 provided with a first group of multiphase stator windings 11 and a second group of multiphase stator windings 12.

The rotary electric machine system also includes first and second inverters 13 and 14, a controller 15, and a power supply 16. The first inverter 13 is connected to the first group of multiphase stator windings 11, and the second inverter 14 is connected to the second group of multiphase stator windings 12.

The controller 15 controls how to energize each of the first and second inverters 13 and 14. The power supply 16 supplies power to the first and second inverters 13 and 14, and receives power supplied from each of the first and second inverters 13 and 14.

The rotary electric machine 10 is, for example, a three-phase double winding-type induction machine. In the present embodiment, the rotary electric machine 10 is a motor generator provided with a power generation function and a power running function, and is configured as an integrated starter generator (ISG) that serves as both an electric generator and an electric motor.

The first group of three-phase stator windings 11 is comprised of U1-phase, V1-phase, and W1-phase windings, and the second group of three-phase stator winding 12 is comprised of U2-phase, V2-phase, and W2-phase windings. The U1- and U2-phase windings are the same U-phase windings, the V1- and V2-phase windings are the same V-phase windings, and the W1- and W2-phase windings are the same W-phase windings.

Each of the first and second inverters 13 and 14 is, as well-known, a power conversion circuit provided with a plurality of switching elements. Controlling switching operations of the switching elements of the first inverter 13 energizes the U1-phase, V1-phase, and W1-phase stator winding 11, and controlling switching operations of the switching elements of the second inverter 14 energizes the U2-phase, V2-phase, and W2-phase stator windings 12.

The controller 15 is an electronic control device mainly comprised of a microcomputer, and configured to perform various control task.

The controller 15 controls the first and second inverters 13 and 14 to thereby adjust a controlled variable, such as torque or rotational speed, of the rotary electric machine 10 to a target value based on a driving state of the vehicle, a state of charge of the power supply 16, and other parameters.

Specifically, in order to control the switching elements of each of the first and second inverters 13 and 14, the controller 15 obtains measurement values measured by various sensors, such as a value of each phase current measured by a current sensor 17, and a value of a rotational angle of the rotary electric machine 10 measured by a rotation angle sensor 18, such as a resolver.

Then, the controller 15 performs known sinusoidal PWM control based on the measurement values measured by the various sensors to thereby generate a binary drive signal having high and low levels for each switching element. Then, the controller 15 outputs the binary drive signal to each switching element of the first inverter 13 to thereby control on-off switching operations of the corresponding switching element, and outputs the binary drive signal to each switching element of the second inverter 14 to thereby control on-off switching operations of the corresponding switching element.

Figure 2:
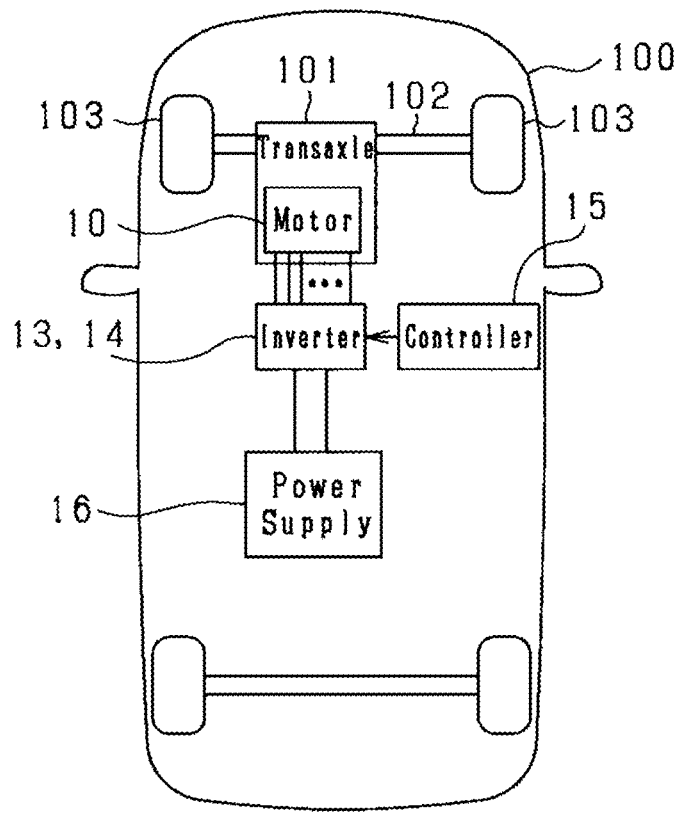
FIG. 2 is a diagram showing a configuration of a vehicle.

Controlling on-off switching operations of each switching element of the first inverter 13 and on-off switching operations of each switching element of the second inverter 14 adjusts (1) Actual currents flowing through the respective stator windings 11 to respective command current values (2) Actual currents flowing through the respective stator windings 12 to respective command current values FIG. 2 illustrates the configuration of a vehicle 100 to which the rotary electric machine system of the present embodiment is installed.

The vehicle 100 is designed as, for example, an electric vehicle having the rotary electric machine 10 as its driving power source, or a hybrid vehicle having the rotary electric machine 10 and an engine (not shown) as its driving power sources.

In the vehicle 100, the rotary electric machine 10 is installed in a power transmission mechanism 101 as a driving power source of the vehicle 100. The vehicle 100 includes wheels 103 and a transaxle 102 such that the wheels 103 rotate together with the transaxle 102 as a result of driving power generated by the rotary electric machine 10.

For example, each of the first and second inverters 13 and 14 is configured to covert direct-current (DC) power supplied from the power supply 16 into alternating-current (AC) power. The AC power is supplied to the rotary electric machine 10, so that the rotary electric machine 10 causes the vehicle 100 to travel.

Figure 3:
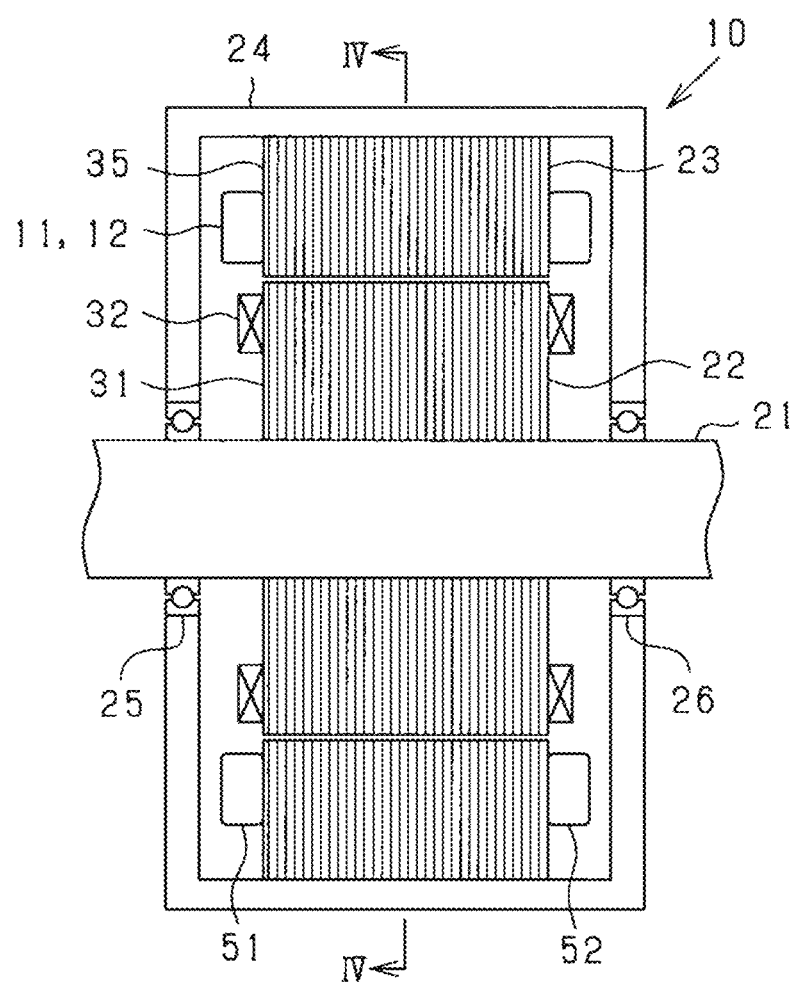
FIG. 3 is a cross-sectional view showing a configuration of a rotary electric machine.
Figure 4:
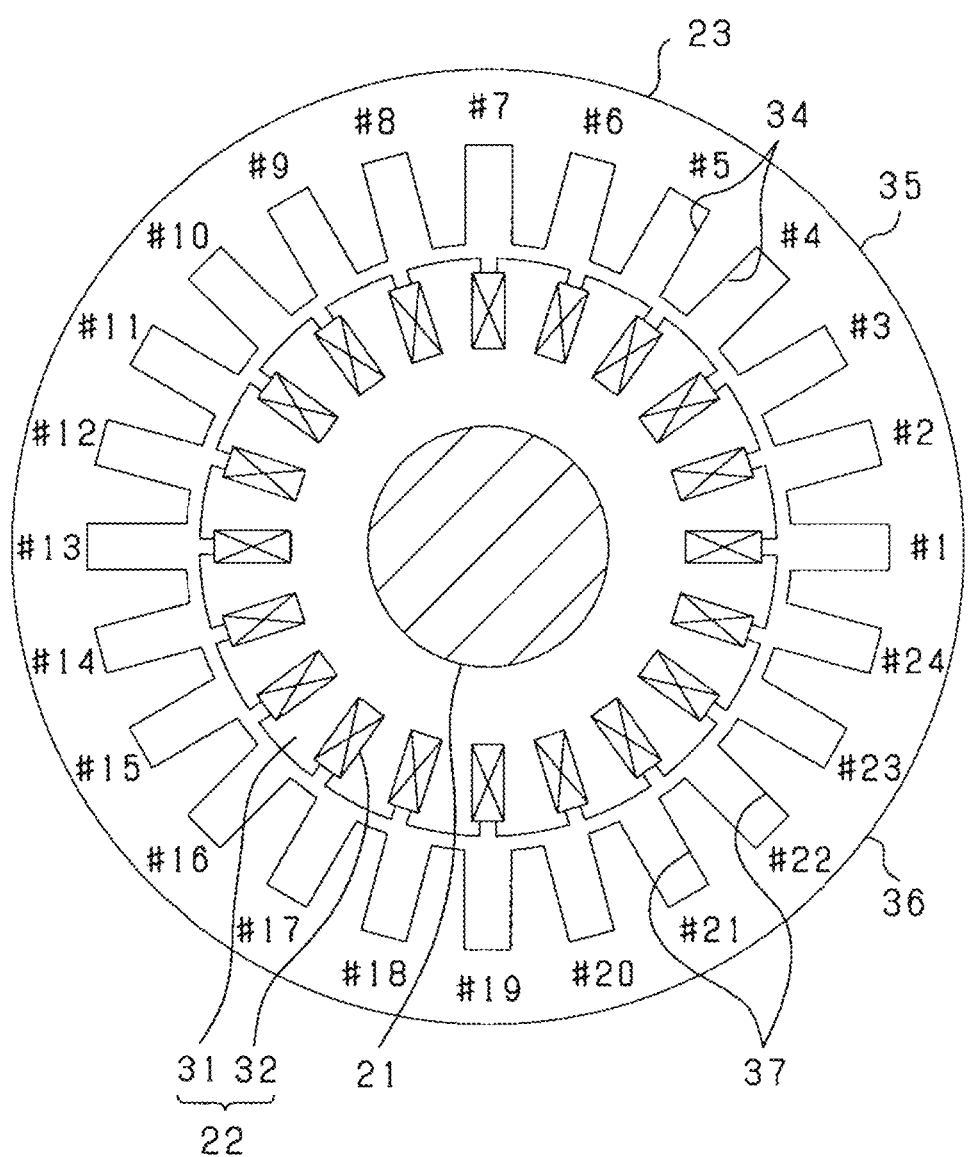
FIG. 4 is a lateral cross-sectional view showing a configuration of each of a rotor and a stator.

Next, the following describes the configuration of the rotary electric machine 10 with reference to FIG. 3 and FIG. 4. In FIG. 4, illustration of the stator windings 11 and 12 is omitted for convenience of the description of the machine 10.

The rotary electric machine 10 includes a rotary shaft 21, a rotor 22, a stator 23, and a housing 24. The rotor 22 is mounted on the rotary shaft 21, and the stator 23 is arranged to surround the rotor 22. The housing 24 accommodates the rotor 22 and the stator 23 such that the rotor 22 and the stator 23 are coaxially disposed to each other. The housing 24 is provided with bearings 25 and 26, and the rotation shaft 21 and the rotor 22 are rotatably supported by the bearings 25 and 26.

The rotor 22 has a rotor core 31, and also has a plurality of conductors 32 mounted to an outer circumferential portion of the rotor core 31; the outer peripheral portion of the rotor core 31 radially faces an inner circumferential portion of the stator 23.

The rotor core 31 is comprised of a plurality of annular electromagnetic steel plates that are stacked in their axial directions and are for example swaged to each other. The rotor 22 is configured as an inductive rotor.

The stator 23 includes an annular stator core 35 provided with a plurality of slots 34 arranged in a circumferential direction of the stator core 35. The stator 23 also includes the first group of three-phase stator windings 11 and the second group of three-phase stator windings 12 that are distributedly wound in the slots 34, so that the first group of three-phase stator windings 11 and the second group of three-phase stator windings 12 are wound around the stator core 35 of the common stator 23.

As shown in FIG. 1, the U1-phase, V1-phase, and W1-phase windings of the stator winding 11 have a phase difference of 120 electrical degrees from each other. First ends of the U1-, V1-, and W1-phase stator windings 11 are connected to a common neutral point N1. The U2-phase, V2-phase, and W2-phase windings of the stator winding 12 have a phase difference of 120 electrical degrees from each other. First ends of the U2-, V2-, and W2-phase stator windings 12 are connected to a common neutral point N2.

The stator core 35 is comprised of a plurality of annular electromagnetic steel plates that are stacked in their axial directions and are for example swaged to each other. The stator core 35 includes an annular yoke 36 and a plurality of teeth 37. The teeth 37 are arranged to protrude radially inward from the yoke 36 with predetermined regular intervals therebetween in the circumferential direction of the yoke 36.

The stator core 35 is also comprised of slots 34 each formed between a corresponding pair of adjacent teeth 37.

As described above, the teeth 37 are provided with the regular intervals therebetween in the circumferential direction of the yoke 36.

Each of the slots 34 has an elongated opening shape in the radial direction of the stator core 35. The number of slots 34 of the first embodiment is set to 24, and the 24 slots 34 are formed in the yoke 36 to be arranged with regular intervals in the circumferential direction of the yoke 36. Slots numbers #1 to #24 are assigned to the respective 24 slots 34.

Figure 5:
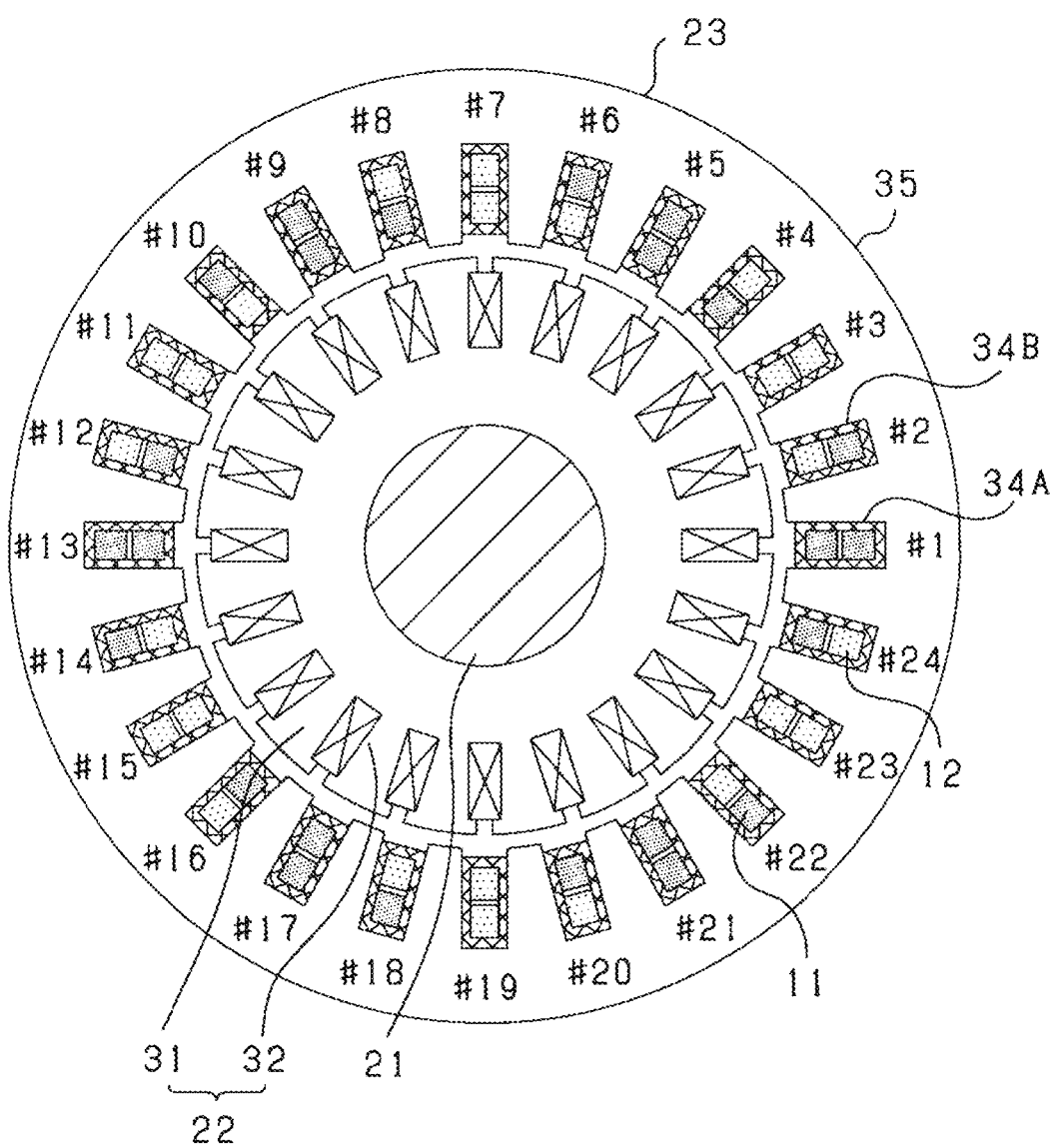
FIG. 5 is a lateral cross-sectional view showing the configuration of each of the rotor and the stator.

The stator windings 11 and 12 are would in corresponding slots in the slots 34 such that two portions selected from at least one of the stator windings 11 and the stator windings 12 are disposed in the respective inner side and outer side of each slot 34 (see FIG. 5). In each slot 34, an insulating member is disposed to enclose individually the two portions disposed in the corresponding slot 34.

In FIG. 5, the portions of the first group of stator windings 11 are represented by darker shading than the portions of the second group of stator windings 12.

Note that the rotary electric machine 10 can be configured to include n sets of three-phase windings, where n is a power of two. The rotary electric machine 10 of the first embodiment is configured to include two sets of three-phase windings 11 and 12, that is, n is set to 2.

The slots 34 of the stator core 35 of the rotary electric machine 10 according to the first embodiment include single-group slots 34A and mixed-group slots 34B.

In each of the single-winding slots 34A, portions of the same phase winding in the same group are disposed; the direction of a current flowing through one of these portions is identical to the direction of a current flowing through the other thereof.

In each of the mixed-winding slots 34B, portions of the same phase windings in the respective different groups are disposed. The single-group slots 34A are arranged at predetermined intervals in the circumferential direction of the stator core 35, and the mixed-group slots 34B are arranged at predetermined intervals in the circumferential direction of the stator core 35.

Each single-group slot 34A corresponds to a first slot, and a mixed-group slot 34B corresponds to a second slot. The details of the single-phase and mixed-group slots 34A and 34B will be described below.

Figure 6:
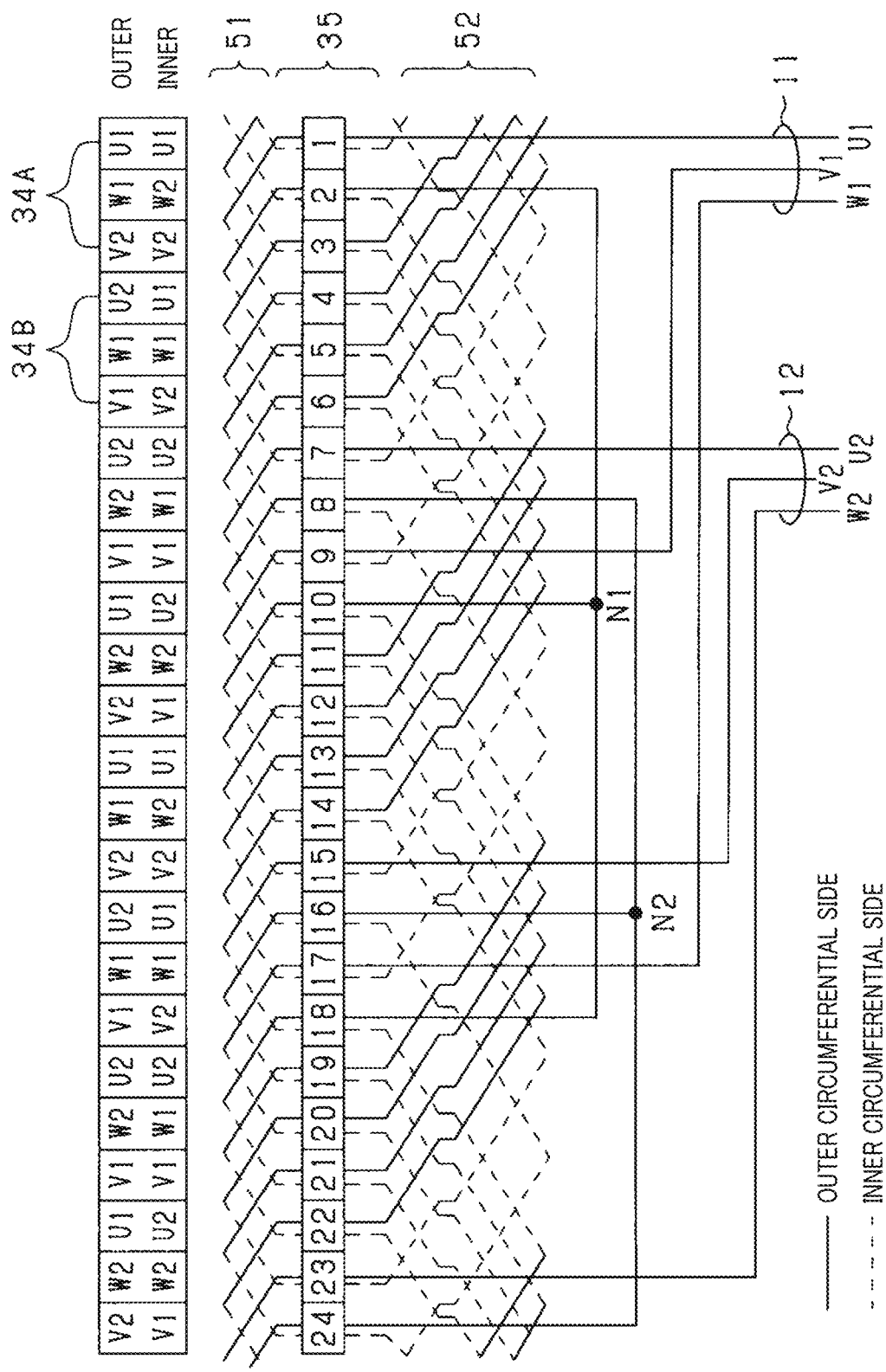
FIG. 6 is a stator winding connection diagram.

FIG. 6 shows the winding state of the stator windings 11 and 12 with respect to the #1 to #24 slots 34. In FIG. 6, for example, a portion of the U1-phase winding is disposed in the outer side of the #1 slot 34, and another portion of the U1 phase winding is disposed in the inner side of the #1 slot 34. The inner and outer portions of the U1-phase winding are energized in a mutually identical direction.

Additionally, a portion of the W1-phase winding is disposed in the outer side of the #2 slot, and a portion of the W2-phase winding is disposed in the inner side of the #2 slot.

That is, the #1 slot 34 serves as one of the single-group slots 34A to accommodate portions of the same phase winding in the same group are disposed; the direction of a current flowing through one of these portions is identical to the direction of a current flowing through the other thereof. In contrast, the #2 slot 34 serves as one of the same-phase slots 34b to accommodate portions of the same phase windings in the respective different groups.

In the same manner, the #3, #5, and #7 slots and the like (odd-numbered slots) are single-group slots 34A, and the #4, #6, and #8 slots and the like (even-numbered slots) are mixed-group slots 34B.

In the first embodiment, the single-group slots 34A and the mixed-group slots 34B are alternatingly arranged in the stator core 35. In other words, the single-group slots 34A are arranged at the prescribed intervals in the circumferential direction, and the mixed-group slots 34B are each arranged between a corresponding one adjacent pair of the single-group slots 34A.

Here, each of the stator windings 11 and 12 is configured by joining a plurality of conductor segments.

Figure 9:
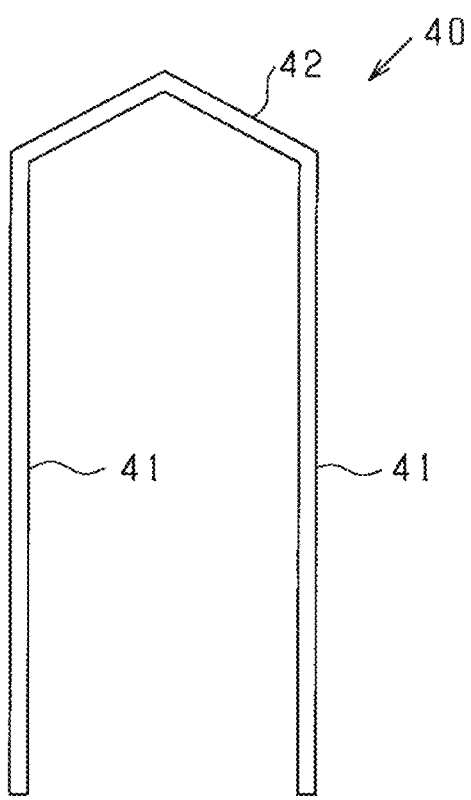
FIG. 9 is a view showing a conductor segment.

Specifically, as shown in FIG. 9, a conductor segment 40 has a basic configuration which is substantially letter-U shaped, and includes a pair of linear portions 41, and a turn portion 42 which joins a first end portion of each of the pair of linear portions 41. Then, in a state where the conductor segments 40 are inserted into the corresponding slots 34 at an interval representing a prescribed number of slots, bending the second end portions of the linear portions 41 in the core circumferential direction, and then joining the linear portions 41 of the different conductor segments 40 to each other. Each of the slots 34 accommodates two conductors which are comprised of the linear portions 41 of the conductor segments 40.

As shown in FIG. 3, the turn portions 42 of the conductor segments 40 constitute a first coil end 51 at a first axial end of the stator 23, and the joined linear portions 41 of the conductor segments 40 constitute a second coil end 52 at an opposite second axial end of the stator 23.

Figure 7:
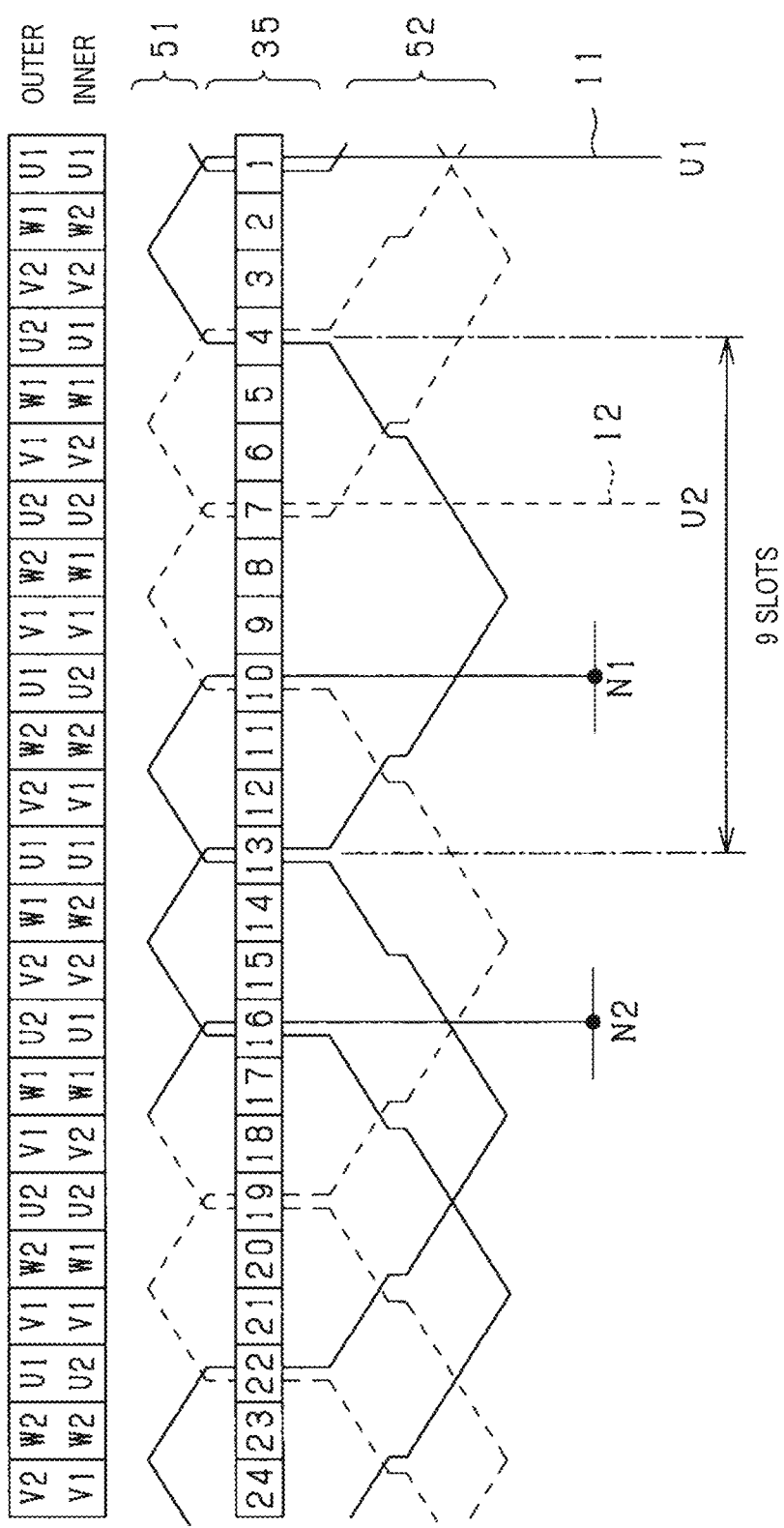
FIG. 7 is a stator winding connection diagram.

FIG. 7 schematically illustrates only the U1-phase winding of the stator windings 11 and the U2-phase winding 12 of the stator windings 12, which are the different-group windings and the same-phase windings, extracted from the connection diagram in FIG. 6.

In FIG. 7, the solid line represents the U1-phase winding, and the broken line represents the U2-phase winding.

The portions of each conductor segment 40 that constitutes the U1-phase winding are disposed in the stator core 35 at an interval of three slots, and the portions of each conductor segment 41 that constitutes the U2-phase winding are disposed in the stator core 35 at an interval of three slots. Two conductor segments 40 are connected to each other at an interval of nine slots at the second coil end 52. In this case, in the stator windings 11 and 12, the slot interval at the second coil end 52, that is, the nine slot interval, is three times greater than the slot interval at the first coil ends 51, that is, three slot interval; the number (three) of times corresponds to the number (three) of phases of each of the first and second sets of the stator windings 11 and 12.

Figure 8:
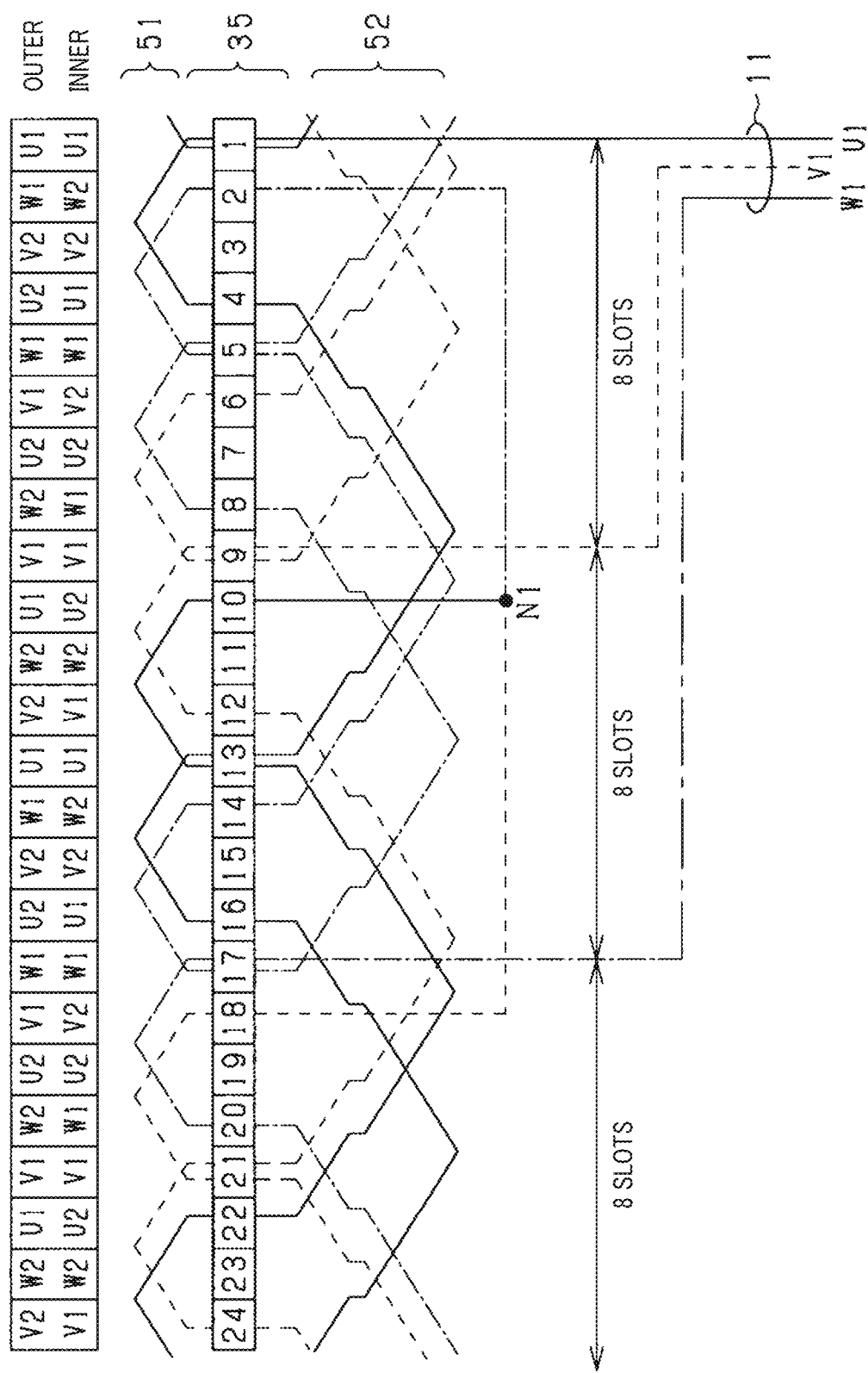
FIG. 8 is a stator winding connection diagram.

FIG. 8 schematically illustrates only the stator windings 11 extracted from the stator windings 11 and 12 of the connection diagram in FIG. 6.

In FIG. 8, the solid line represents the U1-phase winding, the broken line represents the V1-phase winding, and the dashed-dotted line represents the W1-phase winding.

The U1-phase, V1-phase, and W1-phase windings of the stator windings 11 are equally wound around the stator core 35 so as to partition the core 35 in its circumferential direction into three parts.

That is, the phase windings, which are adjacent in terms of energization sequence, are wound around the stator core 35 at constant-slot intervals, that is, eight (8)-slot intervals, in the circumferential direction.

The adjacent phase windings are offset by the 8-slot interval in the circumferential direction, and the winding pattern of each phase is the same as that of the other one of the phases. The offset in the winding patterns of the phase windings is a prescribed electric angle of 120 electrical degrees offset in the energization sequence.

In the stator windings 11, the circumferential direction winding intervals between U1 and V1, V1 and W1, and W1 and U1 are identical, and in the stator winding 12, the circumferential direction winding intervals between U2 and V2, V2 and W2, and W2 and U2 are identical.

Next, the following describes how the controller 15 performs energization control of the stator windings 11 and 12.

The controller 15 of the first embodiment is configured to control the polarity of energization of the same-phase and different-group windings disposed in each mixed-group slot 34B, thus switches the number of poles of the rotary electric machine 10.

Specifically, the controller 15 executes

1. A first energization control that energizes the different-group phase windings, i.e. conductors, disposed in each mixed-group slot 34B in the same energization direction 2. A second energization control that energizes the different-group phase windings, i.e. conductors, disposed in each mixed-group slot 34B such that the energization direction of one of the different-group phase windings in each mixed-group slot 34B is reversed against the energization direction of the other of the different-group phase windings in the corresponding mixed-group slot 34B 3. Switching between execution of the first energization control and the second energization control The controller 15 of the first embodiment is capable of switching between an 8-pole mode in which the number of poles of the rotary electric machine 10 is 8, and a 4-pole mode in which the number of poles of the rotary electric machine 10 is 4.

For driving the rotary electric machine 10 in the 8-pole mode, the controller 15 causes the following electrical currents, which are expressed by the following equations 1, to flow through the respective phase windings:

[Equations 1]

$IU1 = A \cdot \sin(\omega t + \alpha 11)$ $IV1 = A \cdot \sin(\omega t + \alpha 11 - 2\pi/3)$ $IW1 = A \cdot \sin(\omega t + \alpha 11 + 2\pi/3)$ $IU2 = A \cdot \sin(\omega t + \alpha 11)$ $IV2 = A \cdot \sin(\omega t + \alpha 11 - 2\pi/3)$ $IW2 = A \cdot \sin(\omega t + \alpha 11 + 2\pi/3)$ (1)

where:

A represents the amplitude of each of the currents;

ω represents an electrical angular frequency (rad/sec) of the rotary electric machine 10 during the 8-pole mode; and α represents a phase of the corresponding current.

For driving the rotary electric machine 10 in the 4-pole mode, the controller 15 causes the following electrical currents, which are expressed by the following equations 2, to flow through the respective phase windings:

$IU1 = A \cdot \sin(\omega t/2 + \alpha 12)$ $IV1 = A \cdot \sin(\omega t/2 + \alpha 12 + 2\pi/3)$ $IW1 = A \cdot \sin(\omega t/2 + \alpha 12 - 2\pi/3)$ $IU2 = -A \cdot \sin(\omega t/2 + \alpha 12)$ $IV2 = -A \cdot \sin(\omega t/2 + \alpha 12 + 2\pi/3)$ $IW2 = -A \cdot \sin(\omega t/2 + \alpha 12 - 2\pi/3)$ [Equations 2]

Figure 10:
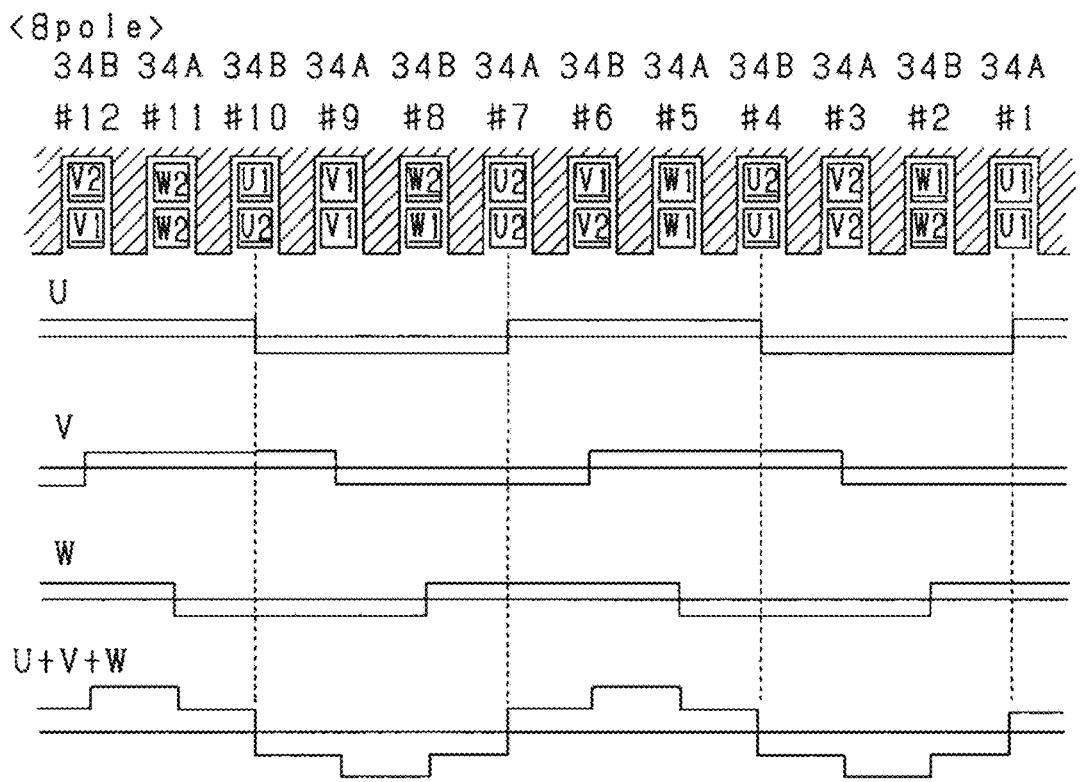
FIG. 10 is a diagram showing an energization operation in an 8-pole mode.
Figure 11:
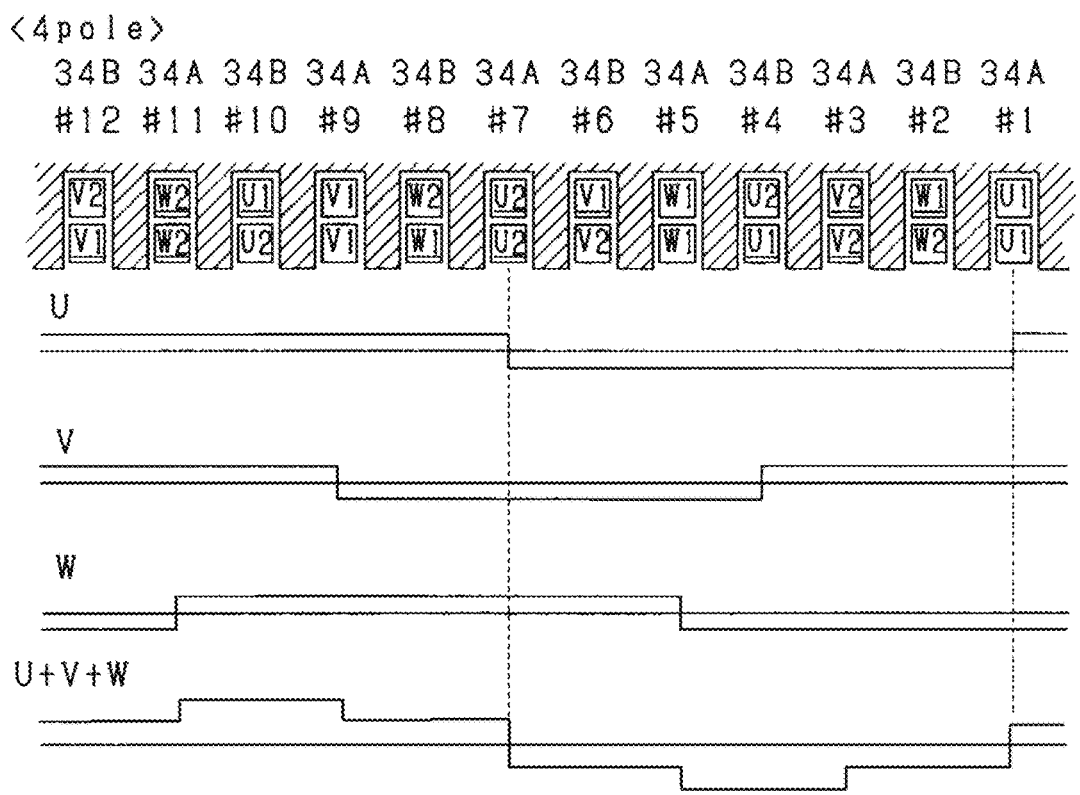
FIG. 11 is a diagram showing an energization operation in a 4-pole mode.

FIG. 10 and FIG. 11 are diagrams showing the energization state of the phase windings in each slot 34, and the U-phase, V-phase, and W-phase magnetomotive force waveforms. FIG. 10 shows the magnetomotive force waveforms in the 8-pole mode, and FIG. 11 shows the magnetomotive force waveform in the 4-pole mode. Each of FIGS. 10 and 11 shows half of the slots 34, i.e. #1 slot 34 to #12 slot 34, in a developed view. The presence or absence of an underline below each phase indicates a difference in the energization direction.

In FIG. 10, for example, with respect to the U-phase, a current flows in the phase windings disposed in each of the #1, #4, #7, and #10 slots 34 in the same direction. The direction of corresponding magnetomotive force in each of the #1, #4, #7, and #10 slots 34 is reversed according to the directions of the currents flowing in the corresponding one of the #1, #4, #7, and #10 slots 34.

At this time, the energization direction of each of the U1-phase and U2-phase windings in the #4 slot 34, i.e. the mixed-group slot 34B, is identical to the energization direction of the corresponding one of the U1-phase and U2-phase windings in the #10 slot 34. Consequently, the U-phase magnetic pole is reversed at each of the single-group slots 34A (#1 and #7) and the mixed-group slots 34B (#4 and #10).

The above descriptions for the U-phase can be applied to the V-phase and the W-phase.

For the V-phase, the V-phase magnetic pole is reversed at each of the single-group slots 34A (#3 and #9) and the mixed-group slots 34B (#6 and #12).

For the W-phase, the W-phase magnetic pole is reversed at each of the single-group slots 34A (#5 and #11) and the mixed-group slots 34B (#2 and #8).

As a result of the energization shown in FIG. 10 above, the magnetomotive force distribution of the stator 23 becomes a full-pitch 8-pole distribution, and the rotary electric machine 10 is driven in the 8-pole mode.

In FIG. 11, for example, with respect to the U-phase, a current flows, in the same direction, in the two-group phase windings disposed in each of the #1 and #7 slots 34, which are the single-group slots 34A, in the #1, #4, #7, and #10 slots 34. In contrast, currents flow, in opposite directions, in the respective two-group phase windings disposed in each of the #4 and #10 slots 34, which are the mixed-group slots 34B, in the #1, #4, #7, and #10 slots 34.

At this time, in each of the #4 and #10 slots 34, which is a corresponding mixed-group slot 34B, the magnetomotive forces generated as a result of energization of the two-group phase windings disposed in each of the #4 and #10 slots 34 cancel one another out. Consequently, the U-phase magnetic poles are reversed in each of the single-group slots 34A (#1 and #7).

The above descriptions for the U-phase can be applied to the V-phase and the W-phase.

For the V-phase, the V-phase magnetic poles are reversed in only the single-group slots 34A (#3 and #9). Furthermore, for the W-phase, the W-phase magnetic poles are reversed in only the single-group slots 34A (#5 and #11).

As a result of the energization shown in FIG. 11 above, the magnetomotive force distribution of the stator 23 becomes a 4-pole distribution, and the rotary electric machine 10 is driven in the 4-pole mode.

In each of the mixed-group slots 34B, as shown in the equations 1 and 2 above, the phase of the current flowing in one of the two-group phase windings is reversed with the phase of the current flowing in the other of the two-group phase windings.

Furthermore, in the equation 2 above, the energization frequency with respect to each phase winding is halved relative to the equation 1 above. As a result, operations of the rotary electric machine 10 can be performed at a desired rotation speed even if the electrical angle phase of a power change varies with switching from the 8-pole mode to the 4-pole mode.

The controller 15 switches the number of poles of the rotary electric machine 10 in accordance with the torque characteristics in the 8-pole mode and the torque characteristics in the 4-pole mode.

Figure 12:
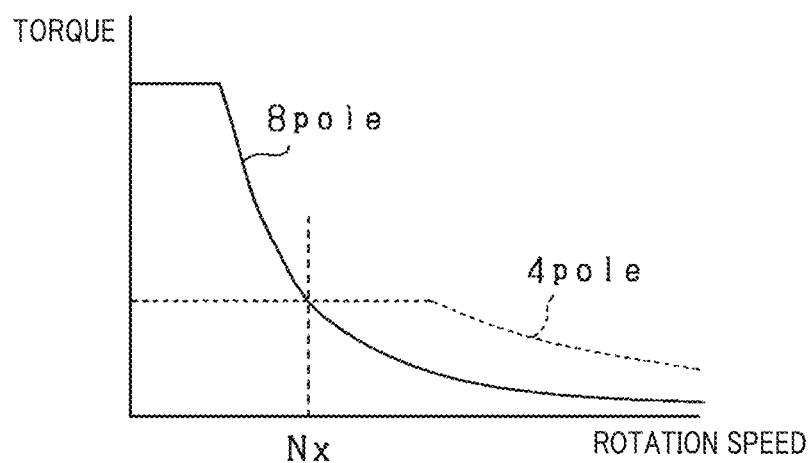
FIG. 12 is a diagram showing torque characteristics in an 8-pole mode and a 4-pole mode.

Specifically, as shown in FIG. 12, the 8-pole mode enables the torque of the rotary electric machine 10 to be higher in the low-rotation region than the 4-pole mode, and the 4-pole mode enables the torque of the rotary electric machine 10 to be higher in the high-rotation region than the 8-pole mode.

On the basis of these torque characteristics, the controller 15, for example, performs 8-pole energization control in the region below a predetermined rotational speed Nx, and performs 4-pole energization control in the region equal to or more than the above the rotational speed Nx.

In accordance with the vehicle travelling state, the controller 15 switches the number of poles of the rotary electric machine 10 from one of the 8-pole mode and the 4-pole mode to the other thereof in response to a vehicle drive request.

For example, the controller 15 switches the number of poles of the rotary electric machine 10 from the 4-pole mode to the 8-pole mode (higher-pole mode) to thereby output higher torque during low-speed running or at startup. In contrast, the controller 15 switches the number of poles of the rotary electric machine 10 from the 8-pole mode to the 4-pole mode (lower-pole mode) to thereby cause the vehicle to travel at a higher speed during high-speed travelling.

Figure 13:
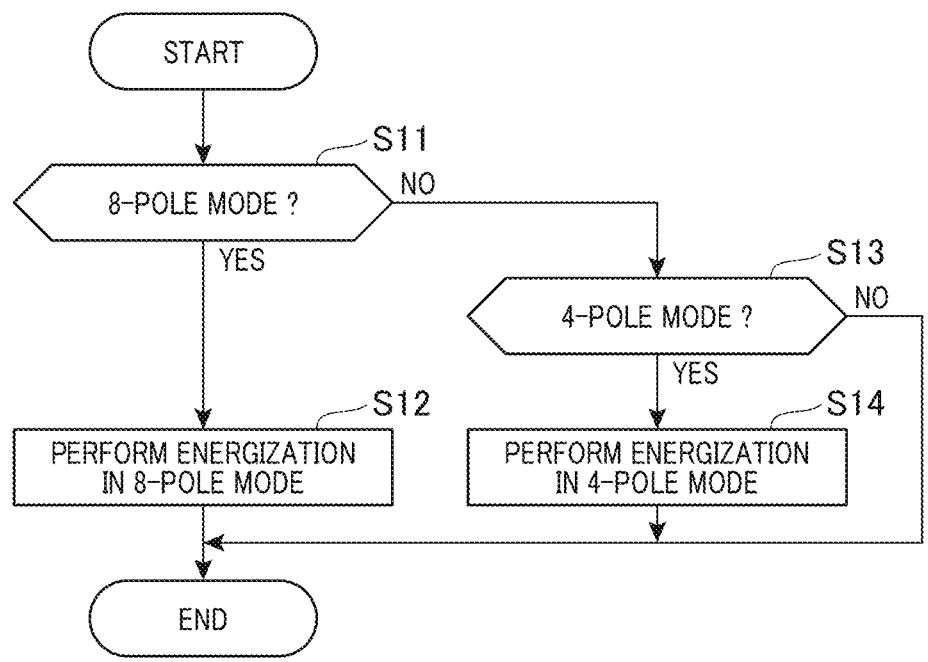
FIG. 13 is a flowchart showing an energization control routine for a rotary electric machine.

FIG. 13 is a flowchart showing an energization control routine for the rotary electric machine 10, which is performed by the controller 15 every predetermined period.

In FIG. 13, the controller 15 determines whether the controller 15 should perform the 8-pole mode in step S11. At this time, for example, if the vehicle 100 is currently traveling at low speeds or is being started, the controller 15 determines that the controller 15 should perform the 8-pole mode (YES in step S11), and the routine proceeds to step S12.

In step S12, the controller 15 controls the phase current that flows in each stator windings 11 and 12 in accordance with the equations 1 above, thus causing the rotary electric machine 10 to perform in the 8-pole mode.

This causes each current to flow through the corresponding one of the two group-windings disposed in each of the mixed-group slots 34B in the same direction.

Otherwise, upon determination that the controller 15 should not perform the 8-pole mode (NO in step S11), the controller 15 determines whether the controller 15 should perform the 4-pole mode in step S13. At this time, for example, if the vehicle 100 is currently traveling at high speeds, the controller 15 determines that the controller 15 should perform the 4-pole mode (YES in step S13), and the routine proceeds to step S14.

In step S14, the controller 15 controls the phase current that flows in each stator windings 11 and 12 in accordance with the equations 2 above, thus causing the rotary electric machine 10 to perform in the 4-pole mode.

This causes currents to flow through the corresponding respective two group-windings disposed in each of the mixed-group slots 34B in the opposite directions from one another.

Note that the operations in steps S11 and S13 correspond to a switching unit, the operation in step S12 corresponds to a first energization control unit, and the operation in step S14 corresponds to a second energization control unit.

The present embodiment described in detail above obtains the following superior effects.

The first embodiment includes the single-group slots 34A and mixed-group slots 34B of the stator core 35, and is configured to control the energization direction of each of the stator windings disposed in each of the slots 34A and 34B to thereby change the number of poles of the rotary electric machine 10. This enables the operating range of the rotary electric machine 10 to expand.

The first embodiment is configured such that the three-phase windings are would around the stator core 35 with identical winding intervals between the adjacent phases of the three-phase windings. This enables electromagnetic forces generated by the respective three-phase windings to be identical to each other regardless of the pole-number mode of the rotary electric machine 10.

Consequently, torque ripples that arise due to circumferential direction imbalances in the magnetomotive forces are reduced, and reductions in vibrations and noise can be achieved. Furthermore, because variations in the phase voltages can be suppressed for the same reason, the high-speed operating range can be further expanded.

The first embodiment is configured such that the single-group slots 34A and the mixed-group slots 34B are alternatingly disposed in the stator core 35.

In other words, the single-group slots 34A, which respectively have the different first and second groups, are arranged at two-slot intervals in the core circumferential direction, and each mixed-group slot 34B is arranged between a corresponding pair of the single-group slots 34A, which respectively have the different first and second groups.

This configuration enables the slots in each of which magnetomotive force is generated, that is, the slots in each of which the energization directions of the two-group phase windings are identical, are arranged to be equally spaced in the core circumferential direction, regardless of the pole-number mode (8-pole mode or 4-pole mode) of the rotary electric machine 10.

As a result, the magnetomotive force can be generated in a well-balanced fashion in the circumferential direction, regardless of the pole number mode.

The first embodiment is configured such that the number of one or more first-group windings, which is one as an example in the first embodiment, and the number of one or more second-group windings, which is one as an example in the first embodiment, disposed in each mixed-group slot 34B are set to be identical to one another. This enables the respective phase windings to be energized using the corresponding phase currents having a same amplitude. This enables the voltage and current rating of each phase of the first inverter 13 to be identical to that of the corresponding phase of the second inverter 14, making it possible to achieve commonality of components of the first and second inverters 13 and 14, resulting in reduction in cost of the first and second inverters 13 and 14.

The first embodiment is configured to perform

1. The first energization control that energizes the different-group phase windings disposed in each mixed-group slot 34B in the same energization direction 2. The second energization control that energizes the different-group phase windings disposed in each mixed-group slot 34B such that the energization direction of one of the different-group phase windings in each mixed-group slot 34B is reversed against the energization direction of the other of the different-group phase windings in the corresponding mixed-group slot 34B 3. Appropriately switching between execution of the first energization control and the second energization control This configuration makes it possible to switch between 1. A first state in which the magnetomotive forces of the phase windings included in each single-group slot 34A are added to each other and the magnetomotive forces of the phase windings included in each mixed-group slot 34B are added to each other 2. A second state in which the magnetomotive forces of the phase windings included only in each single-group slot 34A are added to each other, so that the magnetomotive forces of the phase windings included in each mixed-group slot 34B cancel each other out As a result, it is possible to appropriately switch the number of poles of the rotary electric machine 10 according to, for example, a drive request with respect to the rotary electric machine 10.

The first embodiment is configured to drive the rotary electric machine 10 in the 8-pole mode in the low-rotational speed range, and drive the rotary electric machine 10 in the 4-pole mode in the high-rotational speed range.

Consequently, when the rotary electric machine 10 is used for driving a vehicle, appropriate driving can be carried out when both low-speed high-torque operation and high-speed operation are required for the rotary electric machine 10.

The first embodiment is configured to, when switching the 8-pole mode to the 4-pole mode, reduce the energization frequency applied to each of the phase windings such that the frequency in the 4-pole mode is half that in the 8-pole mode. As a result, operations of the rotary electric machine 10 can be performed at a desired rotation speed even if the electrical angle phase of a power change varies with switching from the 8-pole mode to the 4-pole mode.

In the vehicle 100, the number of poles of the rotary electric machine 10 is switched by motor current control, the operating range of the rotary electric machine 10 can be expanded without increasing the battery capacity. This enables the size, weight, and manufacturing cost of the rotary electric machine system to be reduced. Furthermore, fuel consumption of the vehicle 100 can be improved resulting from expansion of the motor power running region and regeneration region.

In the configuration where the rotary electric machine 10 serves as an induction machine, the number of poles of the rotor 22 can be switched according to the number of poles of the stator 23.

This configuration makes it possible to use, as the rotor 22, a normally available rotor, such as a cage-type rotor, which has a simple and robust structure. This results in the rotary electric machine 10 featuring simpler maintenance, higher reliability, and lower cost.

The following describes the other embodiments. For convenience, the following describes mainly the different points between the first embodiment and each of the other embodiments.

Second Embodiment

The number of slots in the rotary electric machine 10 can be changed, for example, such that the number of slots is doubled.

Figure 14:
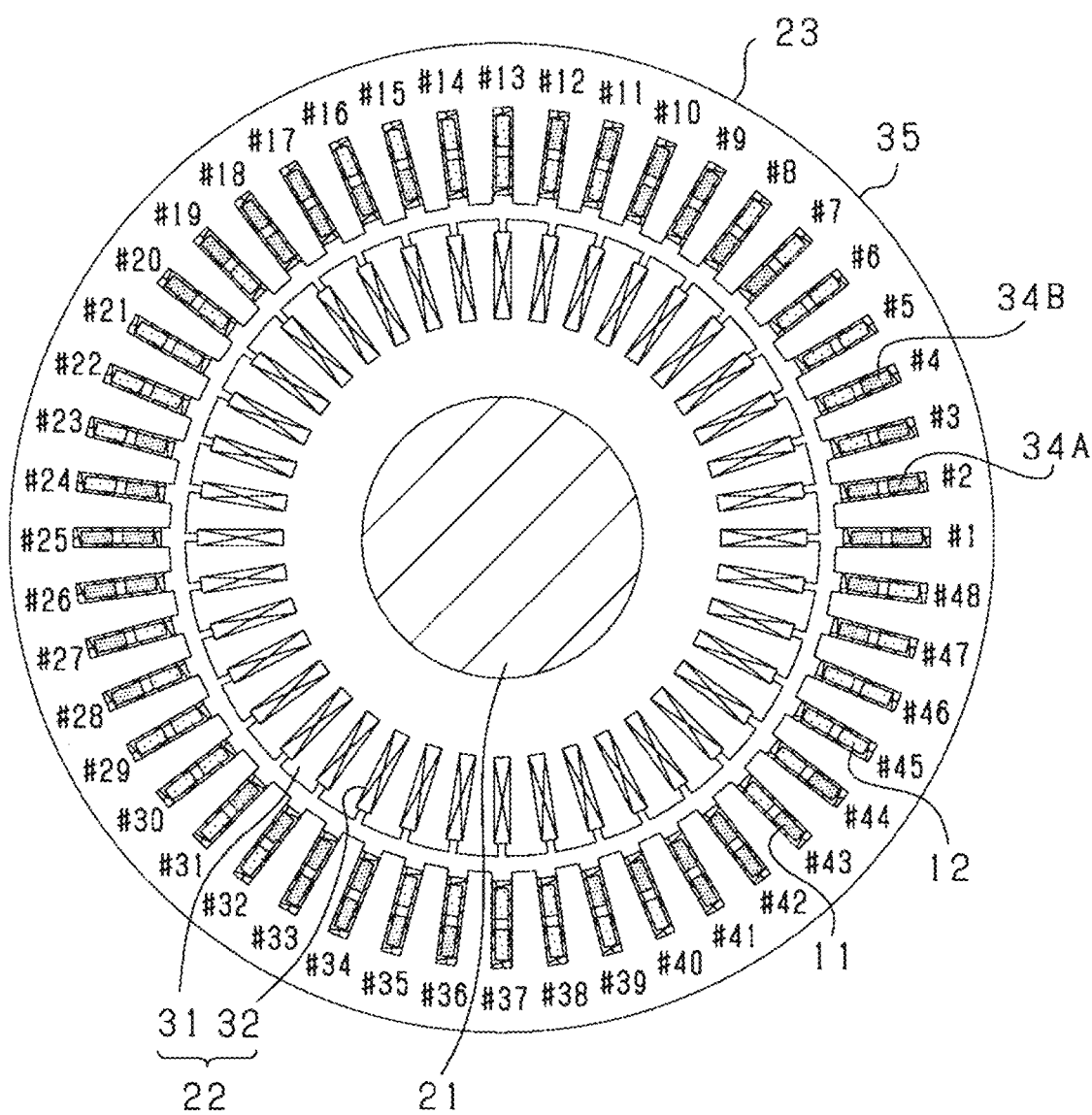
FIG. 14 is a transverse view showing a configuration of a rotor and a stator in a second embodiment.

As illustrated in FIG. 14, the stator core 35 of the second embodiment is comprised of 48 slots 34 that are arranged with regular intervals in the circumferential direction of the core 35. Slots numbers #1 to #48 are assigned to the respective 48 slots 34.

The stator windings 11 and 12 are would in corresponding slots in the slots 34 such that two portions selected from at least one of the stator windings 11 and the stator windings 12 are disposed in the respective inner side and outer side of each slot 34.

In FIG. 14, the portions of the first group of stator windings 11 are represented by darker shading than the portions of the second group of stator windings 12.

Like the first embodiment, the slots 34 of the stator core 35 of the rotary electric machine 10 according to the second embodiment include the single-group slots 34A and the mixed-group slots 34B.

In each of the single-winding slots 34A, portions of the same phase winding in the same group are disposed; the direction of a current flowing through one of these portions is identical to the direction of a current flowing through the other thereof.

In each of the mixed-winding slots 34B, portions of the same phase windings in the respective different groups are disposed. The single-group slots 34A are arranged at predetermined intervals in the circumferential direction of the stator core 35, and the mixed-group slots 34B are arranged at predetermined intervals in the circumferential direction of the stator core 35. In FIG. 14, two of the single-group slots 34A and two of the mixed-group slots 34B are alternatingly arranged.

For example, the #1 and #2 slots serve as slots of the single-group slots 34A, and the #3 and #4 slots serve as slots of the mixed-group slots 34B.

Like the first embodiment, the second embodiment is configured to energize the different-group same-phase windings disposed in each mixed-group slot 34B such that the energization direction of one of the different-group phase windings in each mixed-group slot 34B is reversed against the energization direction of the other of the different-group phase windings in the corresponding mixed-group slot 34B. This changes the number of poles of the rotary electric machine 10.

Figure 15:
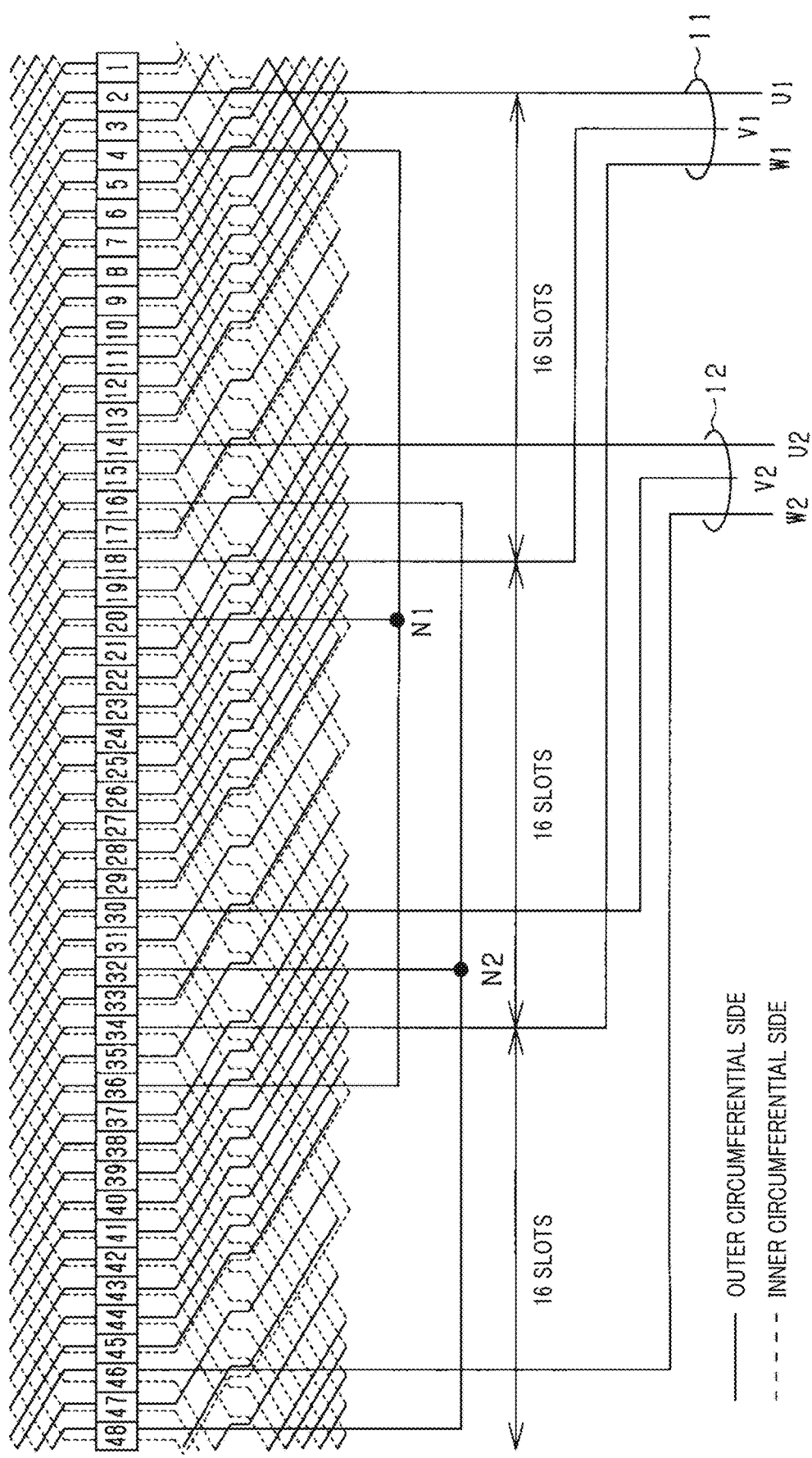
FIG. 15 is a stator winding connection diagram in the second embodiment.

FIG. 15 shows the winding state of the stator windings 11 and 12 with respect to the #1 to #48 slots 34.

Figure 16:
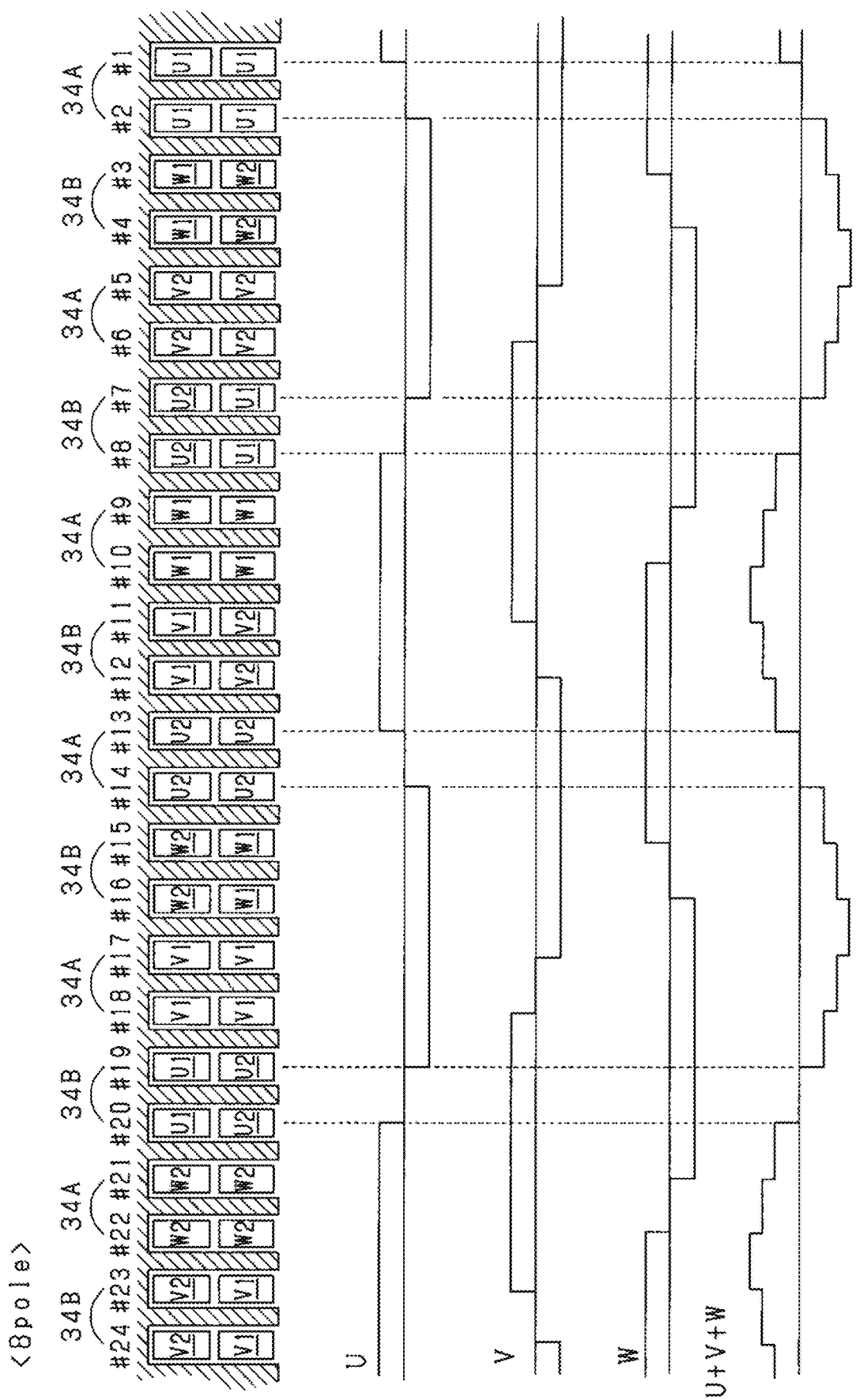
FIG. 16 is a diagram showing an energization operation in an 8-pole mode in the second embodiment.
Figure 17:
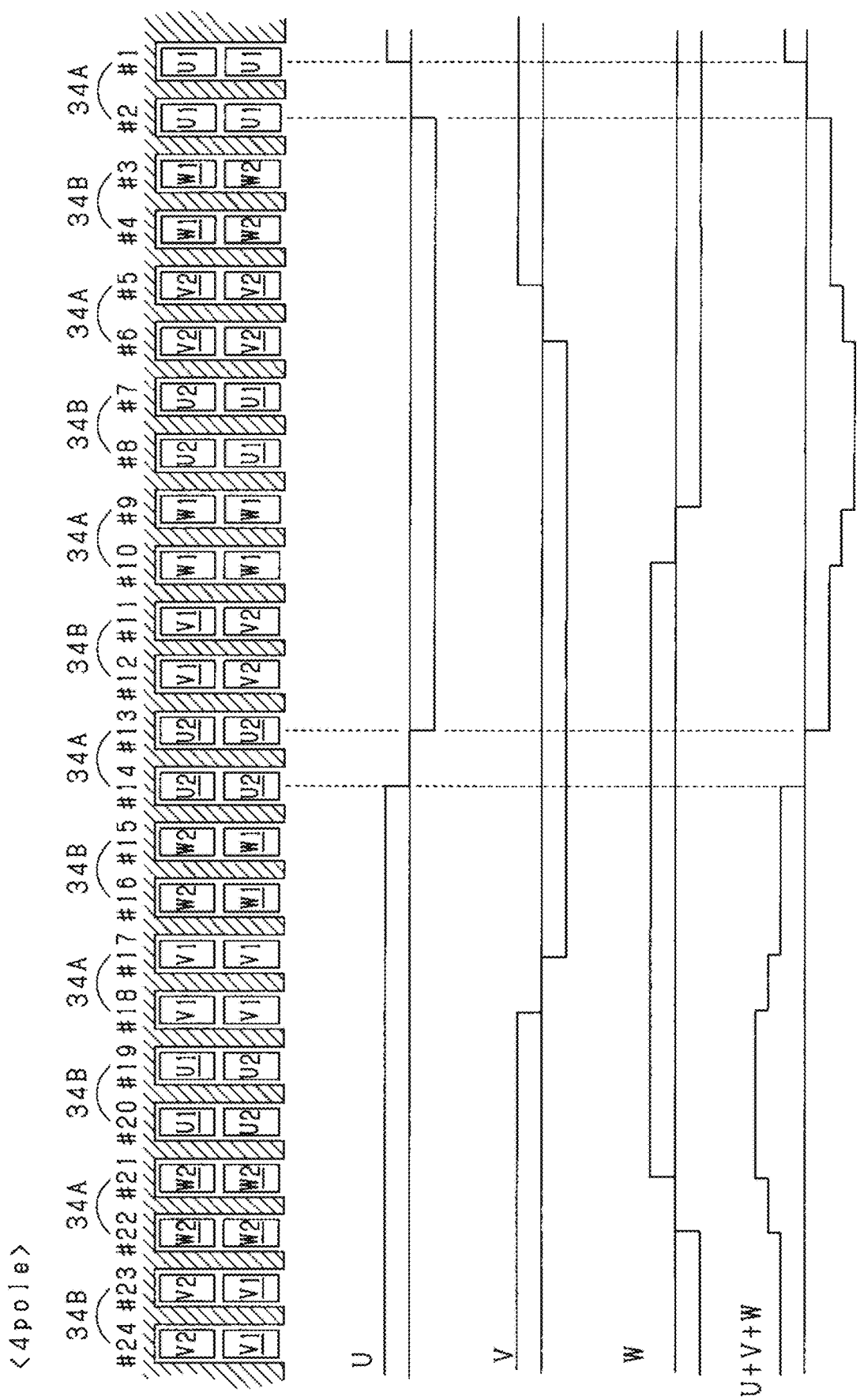
FIG. 17 is a diagram showing an energization operation in a 4-pole mode in the second embodiment.

FIG. 16 and FIG. 17 are diagrams showing the energization state of the phase windings in each slot 34, and the U-phase, V-phase, and W-phase magnetomotive force waveforms. FIG. 16 shows the magnetomotive force waveforms in the 8-pole mode, and FIG. 17 shows the magnetomotive force waveform in the 4-pole mode. Each of FIGS. 16 and 17 shows half of the slots 34, i.e. #1 slot 34 to #12 slot 34, in a developed view.

In FIG. 15, the U1-phase, V1-phase, and W1-phase windings of the stator windings 11 are equally wound around the stator core 35 so as to partition the core 35 in its circumferential direction into three parts. Similarly, the U2-phase, V2-phase, and W2-phase windings of the stator windings 12 are equally wound around the stator core 35 so as to partition the core 35 in its circumferential direction into three parts.

That is, the phase windings, which are adjacent in terms of energization sequence, are wound around the stator core 35 at constant-slot intervals, that is, sixteen (16)-slot intervals, in the circumferential direction.

The adjacent phase windings are offset by the 16-slot interval in the circumferential direction, and the winding pattern of each phase is the same as that of the other one of the phases.

In the 8-pole mode illustrated in FIG. 16, for example, with respect to the U-phase, the energization direction of each of the U1-phase and U2-phase windings in the #7 slot 34, i.e. the mixed-group slot 34B, is identical to the energization direction of the corresponding one of the U1-phase and U2-phase windings in the #8 slot 34. Similarly, the energization direction of each of the U1-phase and U2-phase windings in the #19 slot 34, i.e. the mixed-group slot 34B, is identical to the energization direction of the corresponding one of the U1-phase and U2-phase windings in the #20 slot 34.

Consequently, the U-phase magnetic pole is reversed at each of

1. The first set of single-group slots 34A (#1 and #2)
2. The second set of single-group slots 34A (#13 and #14)
3. The third set of mixed-group slots 34B (#7 and #8)
4. The fourth set of mixed-group slots 34B (#19 and #20)

The above descriptions for the U-phase can be applied to the V-phase and the W-phase.

As a result of the energization shown in FIG. 16 above, the magnetomotive force distribution of the stator 23 becomes a full-pitch 8-pole distribution, and the rotary electric machine 10 is driven in the 8-pole mode.

In contrast, in the 4-pole mode illustrated in FIG. 17, for example, with respect to the U-phase, currents flow, in opposite directions, in the respective two-group phase windings disposed in each of the #7 and #8 slots 34 and #19 and #20 slots, which are the mixed-group slots 34B.

At this time, in each of the #7 and #8 slots 34 and #19 and #20 slots 34, the magnetomotive forces generated as a result of energization of the two-group phase windings disposed in each of the #7 and #8 slots 34 and #19 and #20 slots 34 cancel one another out. Consequently, the U-phase magnetic poles are reversed in each of the 1. The first set of single-group slots 34A (#1 and #2)
2. The second set of single-group slots 34A (#13 and #14)

The above descriptions for the U-phase can be applied to the V-phase and the W-phase.

As a result of the energization shown in FIG. 17 above, the magnetomotive force distribution of the stator 23 becomes a 4-pole distribution, and the rotary electric machine 10 is driven in the 4-pole mode.

Like the first embodiment, the second embodiment is configured to control the energization direction of each of the stator windings disposed in each of the slots 34A and 34B to thereby change the number of poles of the rotary electric machine 10. This enables the operating range of the rotary electric machine 10 to expand.

The first embodiment is configured such that the three-phase windings are would around the stator core 35 with identical winding intervals between the adjacent phases of the three-phase windings. This enables electromagnetic forces generated by the respective three-phase windings to be identical to each other, resulting in reduction in torque ripples and in expansion of the high-speed operating range.

The second embodiment is configured such that two of the single-group slots 34A and two of the mixed-group slots 34B are alternatingly disposed in the stator core 35. In other words, the single-group slots 34A, which respectively have the different first and second groups, are arranged at three-slot intervals in the core circumferential direction, and each two of the mixed-group slots 34B is arranged between a corresponding pair of the single-group slots 34A, which respectively have the different first and second groups.

This configuration enables the slots in each of which magnetomotive force is generated, that is, the slots in each of which the energization directions of the two-group phase windings are identical, are arranged to be equally spaced in the core circumferential direction, regardless of the pole-number mode (8-pole mode or 4-pole mode) of the rotary electric machine 10.

As a result, the magnetomotive force can be generated in a well-balanced fashion in the circumferential direction, regardless of the pole number mode.

Figure 18:
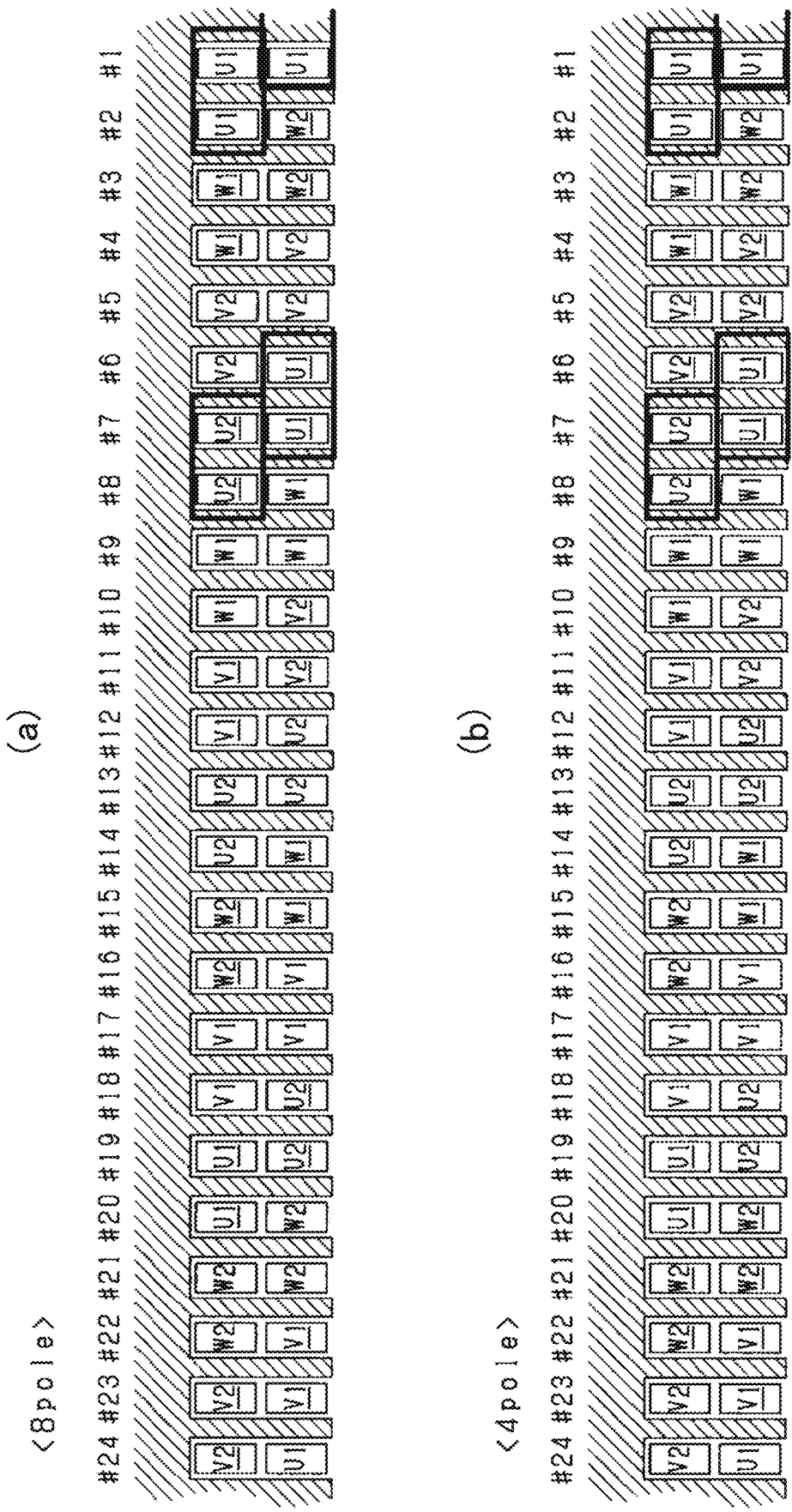
FIG. 18 is a diagram showing a short-pitch winding configuration.

Each of the stator windings 11 and 12 may be configured as a short-pitch winding, the detailed configuration of which is shown in FIG. 18.

Reference character (a) of FIG. 18 shows an energization state when energization is performed in the 8-pole mode, and reference character (b) of FIG. 18 shows an energization state when energization is performed in the 4-pole mode.

In FIG. 18, the energization pattern of the slots for each of the 8- and 4-pole modes is the same as that for the corresponding one of the 8-pole mode (see FIG. 16) and the 4-pole mode (see FIG. 17), and the difference is that each of the phase windings on the inner radial side of the slots 34 is offset by one slot to obtain a short-pitch winding.

Figure 19:
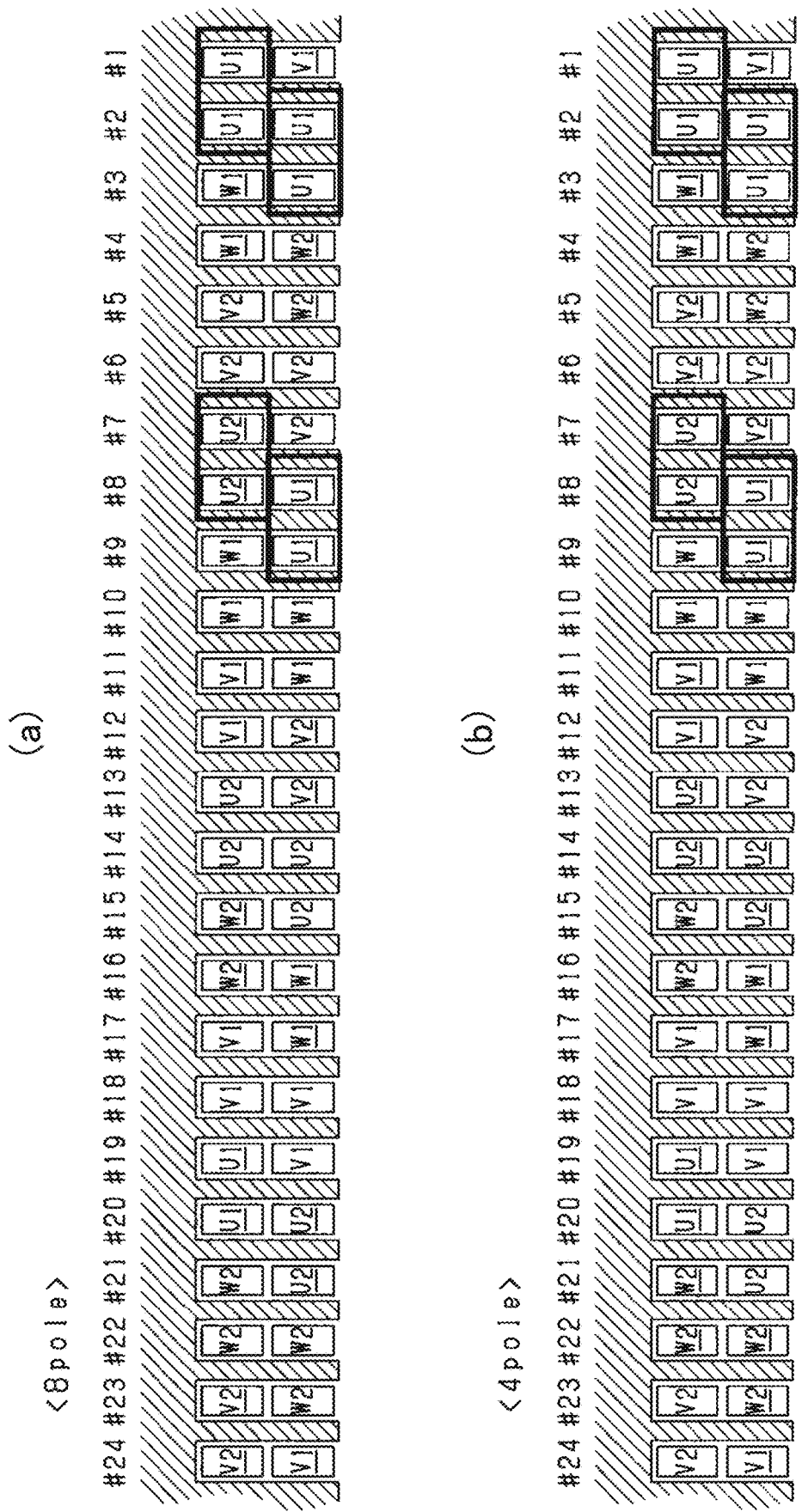
FIG. 19 is a diagram showing a long-pitch winding configuration.

Each of the stator windings 11 and 12 may be configured as a long-pitch winding, the detailed configuration of which is shown in FIG. 19.

Reference character (a) of FIG. 19 shows an energization state when energization is performed in the 8-pole mode, and reference character (b) of FIG. 19 shows an energization state when energization is performed in the 4-pole mode.

In FIG. 19, the energization pattern of the slots for each of the 8- and 4-pole modes is the same as that for the corresponding one of the 8-pole mode (see FIG. 16) and the 4-pole mode (see FIG. 17), and the difference is that each of the phase windings on the inner radial side of the slots 34 is offset by one slot to obtain a full-pitch winding.

Third Embodiment

The third embodiment is configured to be capable of switching the 16-pole mode to the 4-pole mode. In this case, the number of poles of the rotary electric machine 10 is switched based on a pole number ratio of 4:1.

Figure 20:
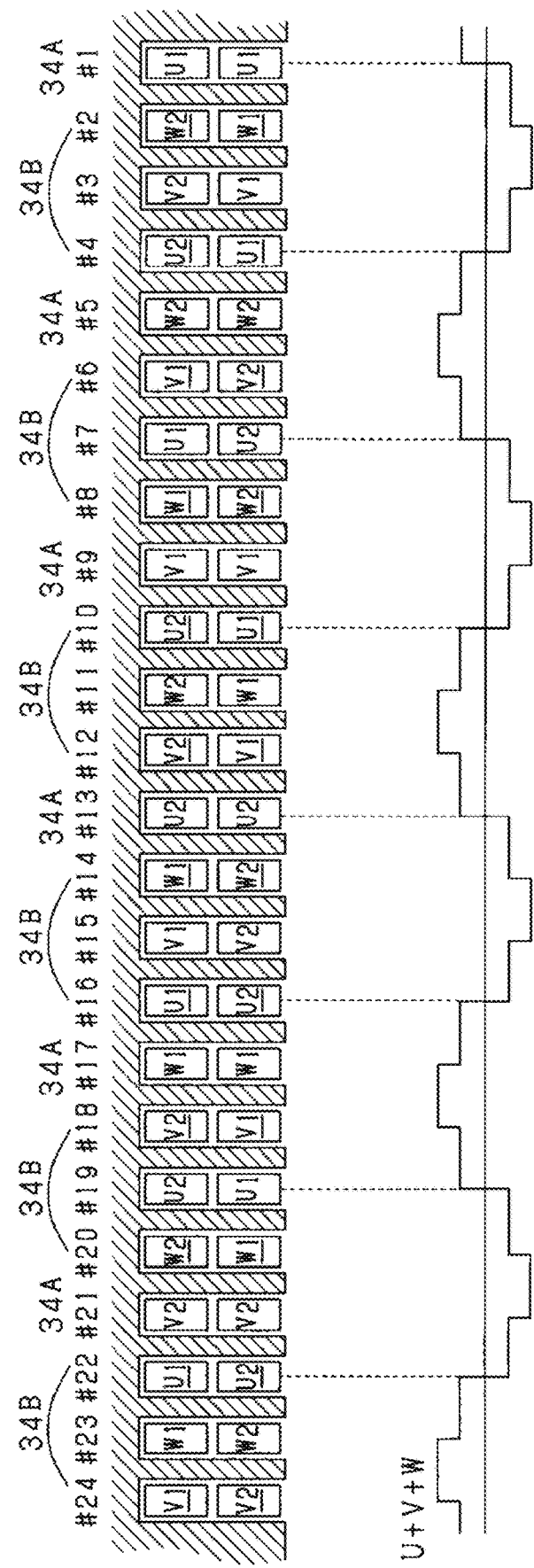
FIG. 20 is a diagram showing an energization operation in a 16-pole mode in a third embodiment.
Figure 21:
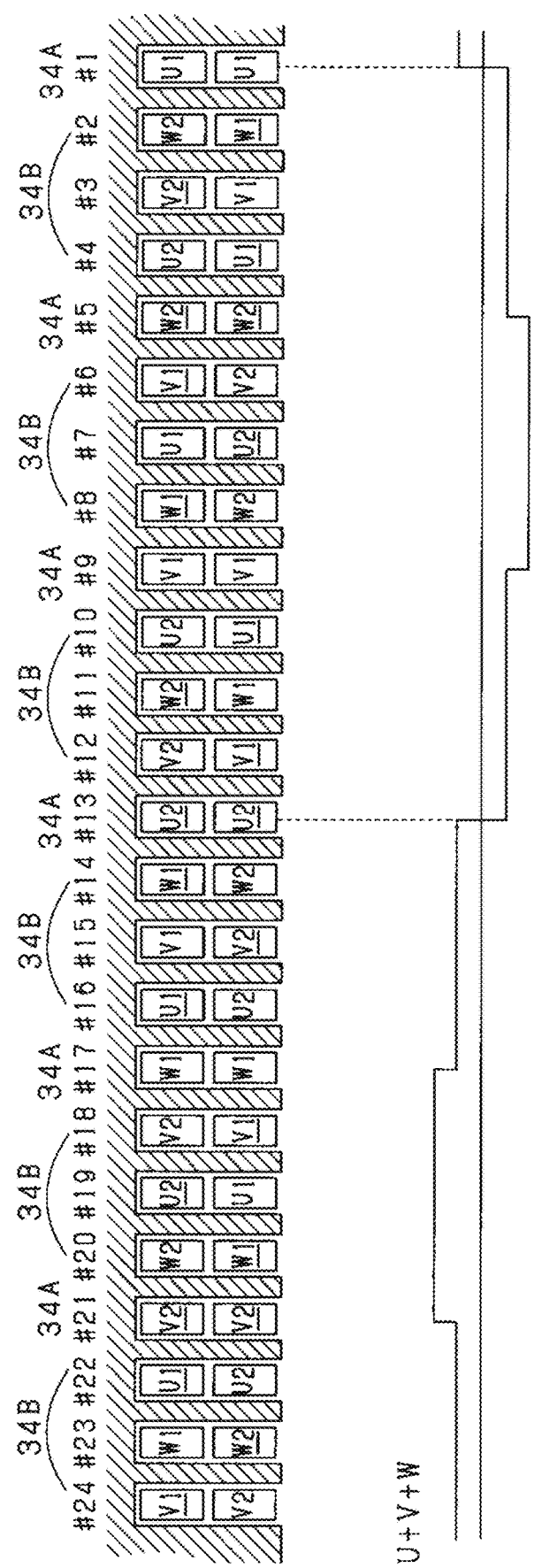
FIG. 21 is a diagram showing an energization operation in a 4-pole mode in the third embodiment.

FIG. 20 and FIG. 21 show the energization state of the phase windings in each slot 34, and the waveform of the resultant magnetomotive force (U+V+W) of the U-phase, V-phase, and W-phase magnetomotive forces.

FIG. 20 shows the waveform of the resultant magnetomotive force (U+V+W) in the 16-pole mode, and FIG. 21 shows the waveform of the resultant magnetomotive force (U+V+W) in the 4-pole mode. Each of FIGS. 20 and 21 shows half of the slots 34 in a developed view.

Referring to FIG. 20, the single-group slots 34A, which respectively have the different first and second groups, are arranged at four-slot intervals in the core circumferential direction, and each three of the mixed-group slots 34B is arranged between a corresponding pair of the single-group slots 34A, which respectively have the different first and second groups.

In the 16-pole mode illustrated in FIG. 20, the energization direction of one of the different-group phase windings in each of the mixed-group slot 34B is identical to the energization direction of the other of the different-group phase windings.

Consequently, at each of the single-group slots 34A and mixed-group slots 34B, the corresponding magnetic pole is reversed.

As a result of the energization shown in FIG. 20 above, the magnetomotive force distribution of the stator 23 becomes a full-pitch 16-pole distribution, and the rotary electric machine 10 is driven in the 16-pole mode.

In contrast, in the 4-pole mode illustrated in FIG. 21, currents flow, in opposite directions, in the respective two-group phase windings disposed in each of the mixed-group slots 34B. For this reason, the magnetomotive forces generated as a result of energization of the two-group phase windings disposed in each of the mixed-group slots 34B cancel one another out. Consequently, the U-phase magnetic poles are reversed in each of the single-group slots 34A.

As a result of the energization shown in FIG. 21 above, the magnetomotive force distribution of the stator 23 becomes a 4-pole distribution, and the rotary electric machine 10 is driven in the 4-pole mode.

For driving the rotary electric machine 10 in the 16-pole mode, the controller 15 causes the following electrical currents, which are expressed by the following equations 3, to flow through the respective phase windings:

$IU1 = A \cdot \sin(2)t + \alpha 11)$ $IV1 = A \cdot \sin(2)t + \alpha 11 - 2\pi/3)$ $IW1 = A \cdot \sin(2)t + \alpha 11 + 2\pi/3)$ $IU2 = A \cdot \sin(2)t + \alpha 11)$ $IV2 = A \cdot \sin(2)t + \alpha 11 - 2\pi/3)$ $IW2 = A \cdot \sin(2)t + \alpha 11 + 2\pi/3)$ [Equations 3]

Similarly, for driving the rotary electric machine 10 in the 4-pole mode, the controller 15 causes the following electrical currents, which are expressed by the following equations 4 identical to the respective equations (2), to flow through the respective phase windings:

$IU1 = A \cdot \sin(\omega t/2 + \alpha 12)$ $IV1 = A \cdot \sin(\omega t/2 + \alpha 12 + 2\pi/3)$ $IW1 = A \cdot \sin(\omega t/2 + \alpha 12 - 2\pi/3)$ $IU2 = -A \cdot \sin(\omega t/2 + \alpha 12)$ $IV2 = -A \cdot \sin(\omega t/2 + \alpha 12 + 2\pi/3)$ $IW2 = -A \cdot \sin(\omega t/2 + \alpha 12 - 2\pi/3)$ [Equations 4]

Note that the electric angle frequency ω is doubled in the equations 3, and the electric angle frequency ω is halved in the equation 4, however the electric angle frequency ω may instead be kept unchanged in the equations 3, and the electric angle frequency ω may be quartered in the equations 4. In other words, the electric angle frequency ω in the 4-pole mode is made one quarter of that of the 16-pole mode. In addition, it is also possible to halve the electric angle frequency ω in the 4-pole mode as compared with the electric angle frequency ω in the 16-pole mode.

Fourth Embodiment

The fourth embodiment has a configuration in which a first pair of different-group phase windings and a second pair of different-group phase windings are disposed in each of the mixed-group slots 34B.

Figure 22:
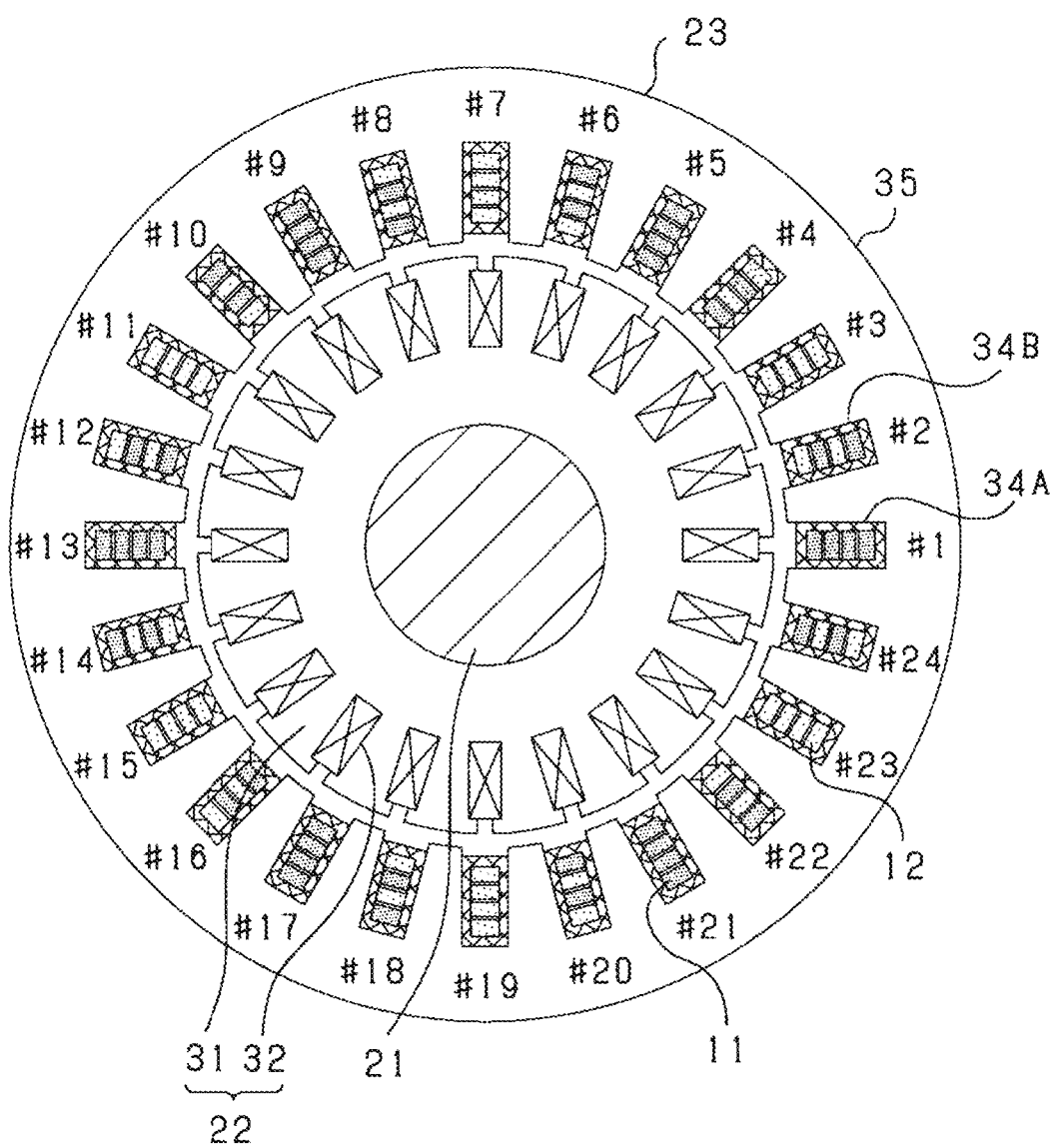
FIG. 22 is a transverse view showing a configuration of a rotor and a stator in a fourth embodiment.

As illustrated in FIG. 22, the stator core 35 of the fourth embodiment is comprised of 24 slots 34 that are arranged with regular intervals in the circumferential direction of the core 35. Slots numbers #1 to #24 are assigned to the respective 24 slots 34.

The stator windings 11 and 12 are would in corresponding slots in the slots 34 such that four portions selected from at least one of the stator windings 11 and the stator windings 12 are disposed in the respective inner side and outer side of each slot 34.

In FIG. 22, the portions of the first group of stator windings 11 are represented by darker shading than the portions of the second group of stator windings 12.

Like the first embodiment, the slots 34 of the stator core 35 of the rotary electric machine 10 according to the fourth embodiment include the single-group slots 34A and the mixed-group slots 34B.

In each of the single-winding slots 34A, portions of the same phase winding in the same group are disposed; the direction of a current flowing through one of these portions is identical to the direction of a current flowing through the other thereof.

In each of the mixed-winding slots 34B, portions of the same phase windings in the respective different groups are disposed. The single-group slots 34A are arranged at predetermined intervals in the circumferential direction of the stator core 35, and the mixed-group slots 34B are arranged at predetermined intervals in the circumferential direction of the stator core 35.

In FIG. 14, two of the single-group slots 34A and two of the mixed-group slots 34B are alternatingly arranged.

In particular, each single-group slot 34A accommodates four phase windings (conductors) of the same group and the same phase, and each mixed-group slot 34B accommodates a first pair of two phase windings (conductors) with the same phase in the respective different groups, and a second pair of two phase windings with the same phase in the respective different groups.

The single-group slots 34A and the mixed-group slots 34B are alternatingly arranged in the stator core 35.

Like each of the above embodiments, the fourth embodiment is configured to energize the different-group same-phase windings disposed in each mixed-group slot 34B such that the energization direction of one of the different-group same-phase windings in each mixed-group slot 34B is reversed against the energization direction of the other of the different-group same-phase windings in the corresponding mixed-group slot 34B. This changes the number of poles of the rotary electric machine 10. The number of phase windings (conductors) accommodated in each slot 34 is freely determined as long as the number is an even number, and, for example, each slot 34 can be configured to accommodate six or eight phase windings.

Figure 23:
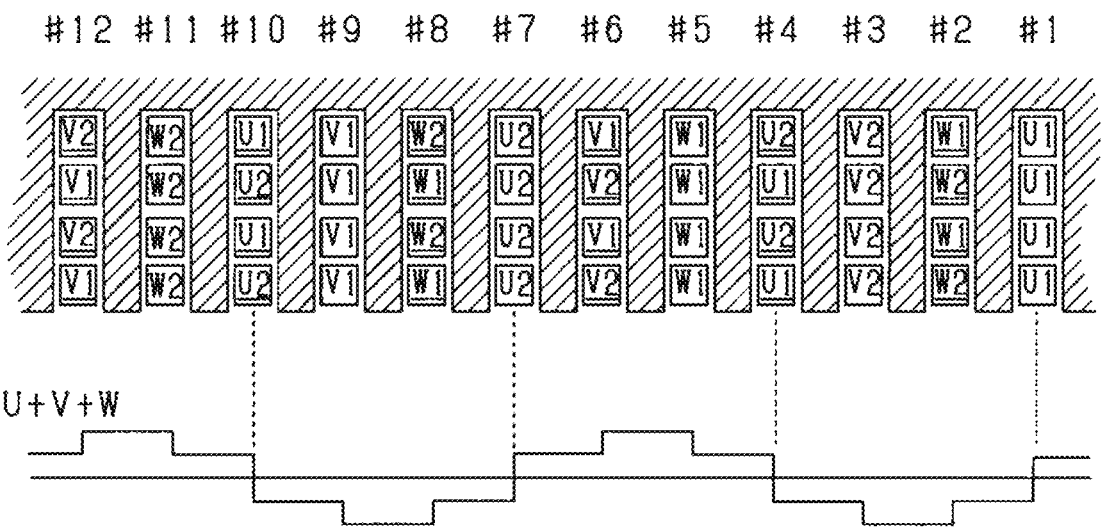
FIG. 23 is a diagram showing an energization operation in an 8-pole mode in the fourth embodiment.
Figure 24:
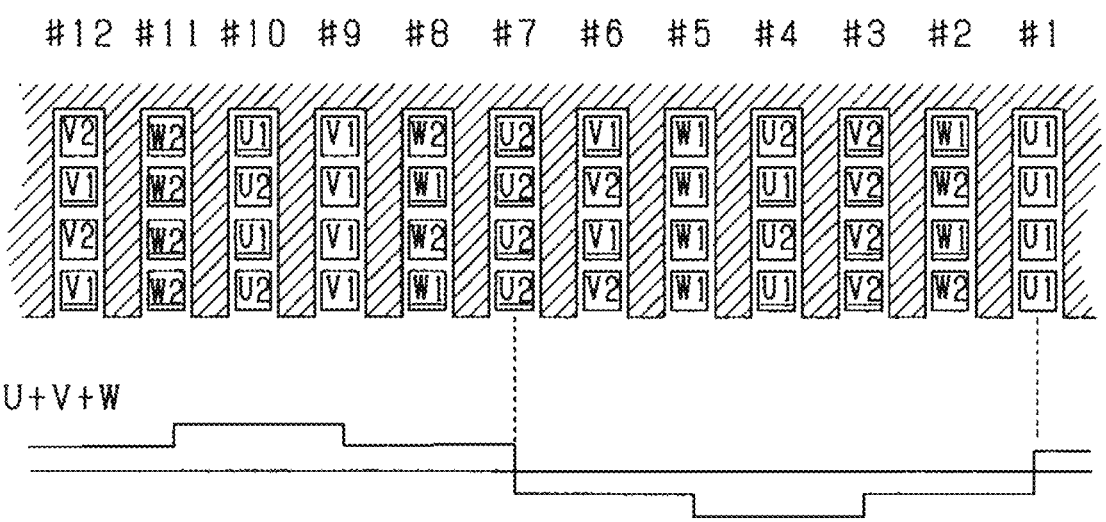
FIG. 24 is a diagram showing an energization operation in a 4-pole mode in the fourth embodiment.

FIG. 23 and FIG. 24 show the energization state of the phase windings in each slot 34, and the waveform of the resultant magnetomotive force (U+V+W) of the U-phase, V-phase, and W-phase magnetomotive forces.

FIG. 23 shows the waveform of the resultant magnetomotive force (U+V+W) in the 8-pole mode, and FIG. 24 shows the waveform of the resultant magnetomotive force (U+V+W) in the 4-pole mode. Each of FIGS. 23 and 24 shows half of the slots 34 in a developed view.

Referring to FIG. 23, the energization directions of the respective different-group phase windings in each of the mixed-group slot 34B are identical to one another.

Consequently, at each of the single-group slots 34A and mixed-group slots 34B, the corresponding magnetic pole is reversed.

As a result of the energization shown in FIG. 23 above, the magnetomotive force distribution of the stator 23 becomes a full-pitch 8-pole distribution, and the rotary electric machine 10 is driven in the 8-pole mode.

In contrast, in the 4-pole mode illustrated in FIG. 24, currents flow, in opposite directions, in the respective two-group phase windings of each of the first and second pairs disposed in each of the mixed-group slots 34B. For this reason, the magnetomotive forces generated as a result of energization of the two-group phase windings of each of the first and second pairs disposed in each of the mixed-group slots 34B cancel one another out. Consequently, the U-phase magnetic poles are reversed in each of the single-group slots 34A.

As a result of the energization shown in FIG. 24 above, the magnetomotive force distribution of the stator 23 becomes a 4-pole distribution, and the rotary electric machine 10 is driven in the 4-pole mode.

Fifth Embodiment

In the fifth embodiment, four groups of stator windings (phase windings) are wound around the stator core 35 in the rotary electric machine 10.

Figure 25:
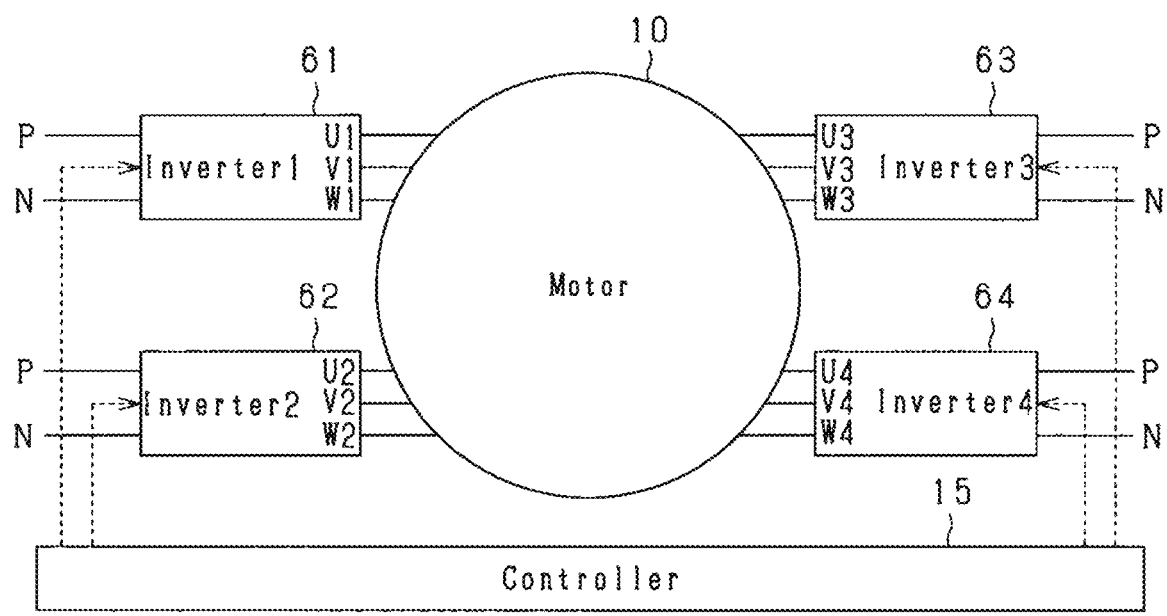
FIG. 25 is a diagram showing a rotary electric machine system provided with four inverters in a fifth embodiment.

In addition, as shown in FIG. 25, four inverters 61 to 64 are provided which respectively correspond to the four groups (first to fourth groups) of stator windings. The inverters 61 to 64 each correspond to a power converter.

The inverters 61 to 64 may be configured as a single power convertor. The fifth embodiment can be configured to control a current to be supplied to each of the three-phase windings of each of the four groups of stator windings to thereby change the number of poles of the rotary electric machine 10 in three steps.

If the fifth embodiment is configured to include $2^{(A-1)}$ groups of phase windings, and to change the number of poles of the rotary electric machine 10 in A-steps, the number of A is set to 3.

The fifth embodiment is configured to switch among the 16-pole mode, in which the number of poles of the machine 10 is set to 16, the 4-pole mode, in which the number of poles of the machine 10 is set to 4, and the 2-pole mode, in which the number of poles of the machine 10 is set to 2.

FIG. 26 to FIG. 28 are diagrams showing energization patterns of the phase windings in each-pole number mode of the 48-slot rotary electric machine 10.

FIG. 26 shows the energization pattern in the 16-pole mode, FIG. 27 shows the energization pattern in the 4-pole mode, and FIG. 28 shows the energization pattern in the 2-pole mode. The presence or absence of an underline below each phase indicates a difference in the energization direction.

In the fifth embodiment, among the #1 to #48 slots, each of the #1, #9, #17, #25, #33, and #41 slots serves as a corresponding one of the single-group slots, and all of the other slots respectively serve as the mixed-group slots.

In this case, a selected one of the first-group phase windings and a selected one of the fourth-group phase windings are disposed in each of the single-group slots.

In each mixed-group slot, selected two different-group and same-phase windings are disposed. In each mixed-group slot, a unique combination of any two-different group windings selected from the first to fourth groups is set to be different from that in the other one of the mixed-group slots.

That is, the mixed-group slots include respective different combinations of two-different group windings selected from the first to fourth groups.

Additionally, the mixed-group slots include, for each phase, three (n–1) types of combinations of any two-different group windings selected from the first to fourth groups. For the U-phase, the mixed-group slots include a first type of combination of U1- and U2-windings, a second type of combination of U2- and U3-windings, and a third type of combination of U3- and U4-windings.

For convenience of description, the slots that correspond to the single-group slots in FIG. 26 are shown shaded.

Furthermore, in FIG. 27 and FIG. 28, among the mixed-group slots, the mixed-group slots in which the energization directions of the two groups of phase windings are identical (that is, slots in which magnetomotive force is generated) are shown shaded in addition to the single-group slots.

In the 16-pole mode shown in FIG. 26, the energization directions of the two groups of phase windings in each of the mixed-group slots are identical to each other. Consequently, the respective magnetic poles are reversed in each of the single-group slots and in each of the mixed-group slots. As a result, the magnetomotive force distribution of the stator 23 becomes a full-pitch 16-pole distribution, and the rotary electric machine 10 is driven in the 16-pole mode.

In the 4-pole mode shown in FIG. 27, among all of the mixed-group slots, the energization directions of the two groups of phase windings are identical in the #5, #13, #21, #29, #37, and #45 slots (shaded mixed-group slots), which accommodate the second group and the third group of phase windings.

That is, the respective magnetic poles are reversed in the single-group slots and the #5, #13, #21, #29, #37, and #45 mixed-group slots described above. As a result, the magnetomotive force distribution of the stator 23 becomes a full-pitch 4-pole distribution, and the rotary electric machine 10 is driven in the 4-pole mode.

In the 2-pole mode shown in FIG. 28, the energization directions of the two groups of phase windings are different for all of the mixed-group slots. In this case, the magnetic poles are reversed in each of the single-group slots. As a result, the magnetomotive force distribution of the stator 23 becomes a full-pitch 2-pole distribution, and the rotary electric machine 10 is driven in the 2-pole mode.

For driving the rotary electric machine 10 in the 16-pole mode, the controller 15 causes the following electrical currents, which are expressed by the following equations 5, to flow through the respective phase windings:

$$IU1 = A \cdot \sin(2\omega t + \alpha 21)$$

$$IV1 = A \cdot \sin(2\omega t + \alpha 21 - 2\pi/3)$$

$$IW1 = A \cdot \sin(2\omega t + \alpha 21 + 2\pi/3)$$

$$IU2 = A \cdot \sin(2\omega t + \alpha 21)$$

$$IV2 = A \cdot \sin(2\omega t + \alpha 21 - 2\pi/3)$$

$$IW2 = A \cdot \sin(2\omega t + \alpha 21 + 2\pi/3)$$

$$IU3 = A \cdot \sin(2\omega t + \alpha 21)$$

$$IV3 = A \cdot \sin(2\omega t + \alpha 21 - 2\pi/3)$$

$$IW3 = A \cdot \sin(2\omega t + \alpha 21 + 2\pi/3)$$

$$IU4 = A \cdot \sin(2\omega t + \alpha 21)$$

$$IV4 = A \cdot \sin(2\omega t + \alpha 21 - 2\pi/3)$$

$$IW4 = A \cdot \sin(2\omega t + \alpha 21 + 2\pi/3) \qquad \text{[Equation 5]}$$

For driving the rotary electric machine 10 in the 4-pole mode, the controller 15 causes the following electrical currents, which are expressed by the following equations 6, to flow through the respective phase windings:

$$IU1 = A \cdot \sin(\omega t/2 + \alpha 22)$$

$$IV1 = A \cdot \sin(\omega t/2 + \alpha 22 - 2\pi/3)$$

$$IW1 = A \cdot \sin(\omega t/2 + \alpha 22 + 2\pi/3)$$

$$IU2 = -A \cdot \sin(\omega t/2 + \alpha 22)$$

$$IV2 = -A \cdot \sin(\omega t/2 + \alpha 22 - 2\pi/3)$$

$$IW2 = -A \cdot \sin(\omega t/2 + \alpha 22 + 2\pi/3)$$

$$IU3 = -A \cdot \sin(\omega t/2 + \alpha 22)$$

$$IV3 = -A \cdot \sin(\omega t/2 + \alpha 22 - 2\pi/3)$$

$$IW3 = -A \cdot \sin(\omega t/2 + \alpha 22 + 2\pi/3)$$

$$IU4 = A \cdot \sin(\omega t/2 + \alpha 22)$$

$$IV4 = A \cdot \sin(\omega t/2 + \alpha 22 - 2\pi/3)$$

$$IW4 = A \cdot \sin(\omega t/2 + \alpha 22 + 2\pi/3) \qquad \text{[Equation 6]}$$

For driving the rotary electric machine 10 in the 2-pole mode, the controller 15 causes the following electrical currents, which are expressed by the following equations 7, to flow through the respective phase windings:

$$IU1 = A \cdot \sin(\omega t/4 + \alpha 23)$$

$$IV1 = A \cdot \sin(\omega t/4 + \alpha 23 + 2\pi/3)$$

$$IW1 = A \cdot \sin(\omega t/4 + \alpha 23 - 2\pi/3)$$

$$IU2 = -A \cdot \sin(\omega t/4 + \alpha 23)$$

$$IV2 = -A \cdot \sin(\omega t/4 + \alpha 23 + 2\pi/3)$$

$$IW2 = -A \cdot \sin(\omega t/4 + \alpha 23 - 2\pi/3)$$

$$IU3 = A \cdot \sin(\omega t/4 + \alpha 23)$$

$$IV3 = A \cdot \sin(\omega t/4 + \alpha 23 + 2\pi/3)$$

$$IW3 = A \cdot \sin(\omega t/4 + \alpha 23 - 2\pi/3)$$

$$IU4 = -A \cdot \sin(\omega t/4 + \alpha 23)$$

$$IV4 = -A \cdot \sin(\omega t/4 + \alpha 23 + 2\pi/3)$$

$$IW4 = -A \cdot \sin(\omega t/4 + \alpha 23 - 2\pi/3) \qquad \text{[Equation 7]}$$

Here, a supplementary description of the energization control in each pole number mode is provided. In the 16-pole mode, as can be understood from Equation 5 above, the controller 15 causes the directions of the energization currents of each group and each phase to all be identical. As a result, as shown in FIG. 26, the energization directions of the two groups of phase windings in the same slot become identical in the single-group slots and all of the mixed-group slots, and the number of poles of the rotary electric machine 10 becomes a maximum value (16 poles).

Furthermore, in the 4-pole mode, as can be understood from Equation 6 above, the controller 15 reverses, among the energization currents of each group and each phase, the direction of the energization currents of the second group and the third group (IU2, IV2, IW2, IU3, IV3, and IW3). In this case, for example, among the U1-U2, U2-U3, and U3-U4 combinations of phase windings in the U-phase mixed-group slots, the energization directions become identical for the U2-U3 combination, and the energization directions are mutually opposing for the U1-U2 and U3-U4 combinations. As a result, as shown in FIG. 27, the energization directions of the two groups of phase windings in the same slot become identical in the single-group slots and some of the mixed-group slots (mixed-group slots which are combinations of the second and third group), and the number of poles of the rotary electric machine 10 becomes 4 poles.

Furthermore, in the 2-pole mode, as can be understood from Equation 7 above, the controller 15 reverses, among the energization currents of each group and each phase, the direction of the energization currents of the second group and the fourth group (IU2, IV2, IW2, IU4, IV4, and IW4). In this case, for example, the energization directions are mutually opposing for all of the U1-U2, U2-U3, and U3-U4 combinations of phase windings in the U-phase mixed-group slots. As a result, as shown in FIG. 28, the energization directions of the two groups of phase windings in the same slot become identical in only the single-group slots, and the number of poles of the rotary electric machine 10 becomes 2 poles.

In other words, as shown in FIG. 26 to FIG. 28, the controller 15 selectively executes, at the time of energization of the phase windings, a first task (see FIG. 27) which causes the energization directions of the phase windings in some of the mixed-group slots to become different, and a second task (see FIG. 28) which causes the energization directions of the phase windings in all of the mixed-group slots to become different.

According to the above configuration of the present embodiment, the two groups of phase windings accommodated in the mixed-group slots represent three different types of combinations for each phase. In this case, by using the mixed-group slots having three types of combinations for each phase, and appropriately energizing the mixed-group slots, an advantageous configuration can be realized when implementing a pole number ratio having multiple levels.

Furthermore, because a configuration is used that selectively executes, at the time of energization of the phase windings, a first task which causes the energization directions of the phase windings in some of the mixed-group slots to become different, and a second task which causes the energization directions of the phase windings in all of the mixed-group slots to become different, the number of poles in the rotary electric machine 10 can be appropriately switched in three or more steps The inverters 61 to 64 are provided to the four groups of phase windings, and the controller 15 performs power conversion with respect to each of the inverters 61 to 64 to control the energization of the phase windings in the rotary electric machine 10. In this case, because each group of phase windings is driven in parallel by individual inverters 61 to 64, redundancy can be ensured when the rotary electric machine 10 is driven.

Sixth Embodiment

In the sixth embodiment, eight groups of stator windings (phase windings) are wound around the stator core 35 in the rotary electric machine 10.

Figure 29:
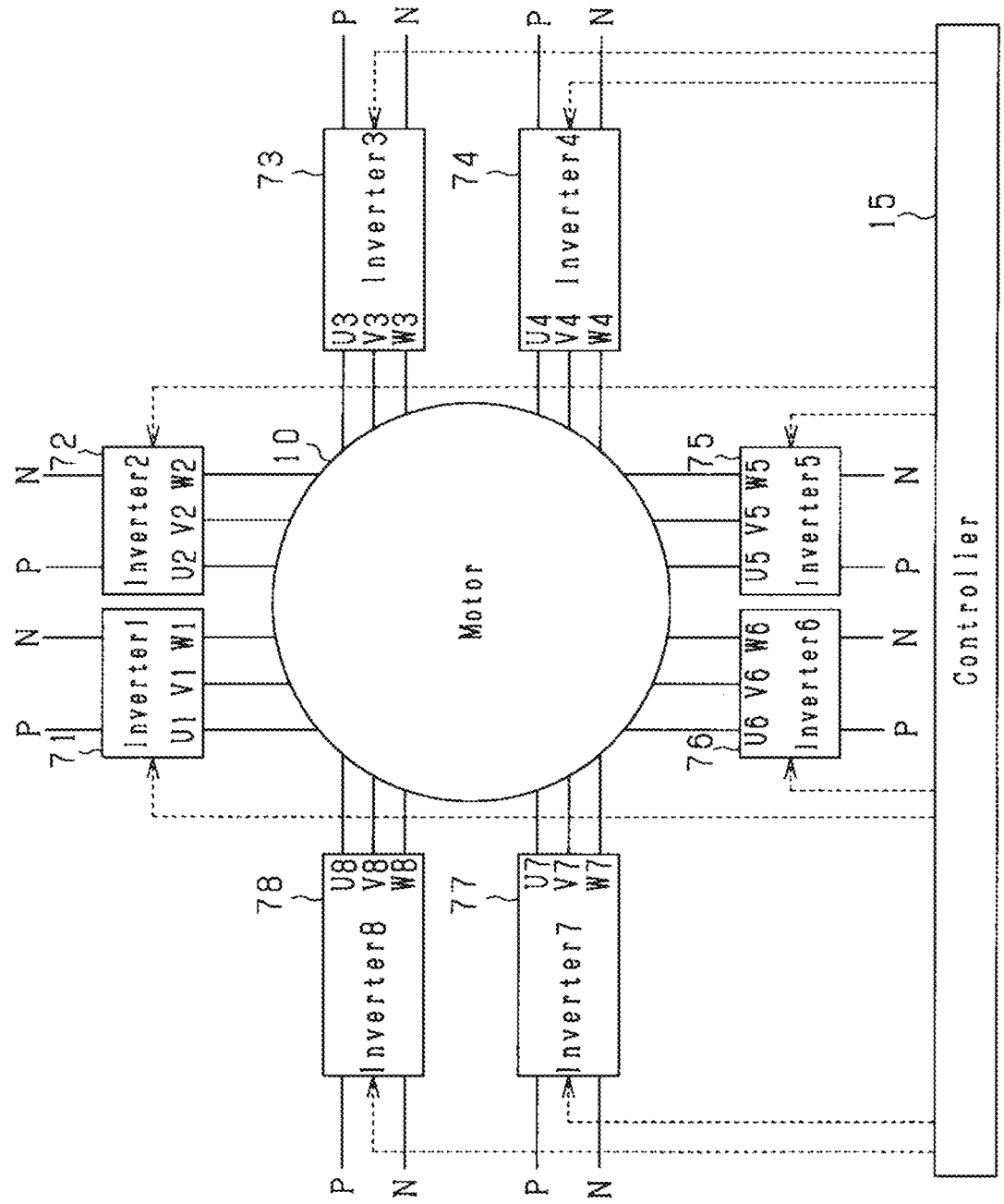
FIG. 29 is a diagram showing a rotary electric machine system provided with eight inverters in a sixth embodiment.

In addition, as shown in FIG. 29, eight inverters 71 to 78 are provided which respectively correspond to eight groups (first to eighth groups) of stator windings. The inverters 71 to 78 each correspond to a power converter. The sixth embodiment can be configured to control a current to be supplied to each of the three-phase windings of each of the eight groups of stator windings to thereby change the number of poles of the rotary electric machine 10 in four steps.

If the sixth embodiment is configured to include $2^{(A-1)}$ groups of phase windings, and to change the number of poles of the rotary electric machine 10 in A-steps, the number of A is set to 4.

The sixth embodiment is configured to switch among the 16-pole mode, in which the number of poles of the machine 10 is set to 16, the 8-pole mode, in which the number of poles of the machine 10 is set to 8, the 4-pole mode, in which the number of poles of the machine 10 is set to 4, and the 2-pole mode, in which the number of poles of the machine 10 is set to 2.

FIG. 30 to FIG. 33 are diagrams showing energization patterns of the phase windings in each pole number mode of the 48-slot rotary electric machine 10.

FIG. 30 shows the energization pattern in the 16-pole mode, FIG. 31 shows the energization pattern in the 8-pole mode, FIG. 32 shows the energization pattern in the 4-pole mode, and FIG. 33 shows the energization pattern in the 2-pole mode. The presence or absence of an underline below each phase indicates a difference in the energization direction.

In the sixth embodiment, among the #1 to #48 slots, each of #1, #9, #17, #25, #33, and #41 slots serves as a corresponding one of the single-group slots, and all of the other slots respectively serve as the mixed-group slots.

In this case, a selected one of the first-group phase windings and a selected one of the eighth-group phase windings are disposed in each of the single-group slots.

In each mixed-group slot, selected two different-group and same-phase windings are disposed. In each mixed-group slot, a unique combination of any two-different group windings selected from the first to eighth groups is set to be different from that in the other one of the mixed-group slots.

That is, the mixed-group slots include respective different combinations of two-different group windings selected from the first to eighth groups.

Additionally, the mixed-group slots include, for each phase, seven (n−1) types of combinations of any two-different group windings selected from the first to eighth groups.

For convenience of description, the slots that correspond to the single-group slots in FIG. 30 are shown shaded.

Furthermore, in FIG. 31 to FIG. 33, among the mixed-group slots, the mixed-group slots in which the energization directions of the two groups of phase windings are identical (that is, slots in which magnetomotive force is generated) are shown shaded in addition to the single-group slots.

In the 16-pole mode shown in FIG. 30, the energization directions of the two groups of phase windings are identical for all of the mixed-group slots.

Consequently, the respective magnetic poles are reversed in the single-group slots and the mixed-group slots. As a result, the magnetomotive force distribution of the stator 23 becomes a full-pitch 16-pole distribution, and the rotary electric machine 10 is driven in the 16-pole mode.

In the 8-pole mode shown in FIG. 31, among all of the mixed-group slots, the energization directions of the two groups of phase windings are identical in 1. The #7, #11, #23, #27, #39, #43 slots, which accommodate the second group and the third group of phase windings
2. The #5, #13, #21, #29, #37, #45 slots, which accommodate the fourth group and the fifth group of phase windings
3. The #3, #15, #19, #31, #35, #47 slots, which accommodate the sixth group and seventh group of phase windings (each of which are mixed-group slots that are shaded)

That is, the respective magnetic poles are reversed in the single-group slots and the mixed-group slots described above. As a result, the magnetomotive force distribution of the stator 23 becomes a full-pitch 8-pole distribution, and the rotary electric machine 10 is driven in the 8-pole mode.

In the 4-pole mode shown in FIG. 32, among all of the mixed-group slots, the energization directions of the two groups of phase windings is identical in the #5, #13, #21, #29, #37, and #45 slots (shaded mixed-group slots), which accommodate the fourth group and the fifth group of phase windings.

That is, the respective magnetic poles are reversed in the single-group slots and the mixed-group slots described above. As a result, the magnetomotive force distribution of the stator 23 becomes a full-pitch 4-pole distribution, and the rotary electric machine 10 is driven in the 4-pole mode.

In the 2-pole mode shown in FIG. 33, the energization directions of the two groups of phase windings are different for all of the mixed-group slots. In this case, the magnetic poles are reversed in only the single-group slots. As a result, the magnetomotive force distribution of the stator 23 becomes a full-pitch 2-pole distribution, and the rotary electric machine 10 is driven in the 2-pole mode.

For driving the rotary electric machine 10 in the 16-pole mode, the controller 15 causes the following electrical currents, which are expressed by the following equations 8, to flow through the respective phase windings:

$$IU1 = A \cdot \sin(2\omega t + \alpha 31)$$

$$IV1 = A \cdot \sin(2\omega t + \alpha 31 - 2\pi/3)$$

$$IW1 = A \cdot \sin(2\omega t + \alpha 31 + 2\pi/3)$$

$$IU2 = A \cdot \sin(2\omega t + \alpha 31)$$

$$IV2 = A \cdot \sin(2\omega t + \alpha 31 - 2\pi/3)$$

$$IW2 = A \cdot \sin(2\omega t + \alpha 31 + 2\pi/3)$$

$$IU3 = A \cdot \sin(2\omega t + \alpha 31)$$

$$IV3 = A \cdot \sin(2\omega t + \alpha 31 - 2\pi/3)$$

$$IW3 = A \cdot \sin(2\omega t + \alpha 31 + 2\pi/3)$$

$$IU4 = A \cdot \sin(2\omega t + \alpha 31)$$

$$IV4 = A \cdot \sin(2\omega t + \alpha 31 - 2\pi/3)$$

$$IW4 = A \cdot \sin(2\omega t + \alpha 31 + 2\pi/3)$$

$$IU5 = A \cdot \sin(2\omega t + \alpha 31)$$

$$IV5 = A \cdot \sin(2\omega t + \alpha 31 - 2\pi/3)$$

$$IW5 = A \cdot \sin(2\omega t + \alpha 31 + 2\pi/3)$$

$$IU6 = A \cdot \sin(2\omega t + \alpha 31)$$

$$IV6 = A \cdot \sin(2\omega t + \alpha 31 - 2\pi/3)$$

$$IW6 = A \cdot \sin(2\omega t + \alpha 31 + 2\pi/3)$$

$$IU7 = A \cdot \sin(2\omega t + \alpha 31)$$

$$IV7 = A \cdot \sin(2\omega t + \alpha 31 - 2\pi/3)$$

$$IW7 = A \cdot \sin(2\omega t + \alpha 31 + 2\pi/3)$$

$$IU8 = A \cdot \sin(2\omega t + \alpha 31)$$

$$IV8 = A \cdot \sin(2\omega t + \alpha 31 - 2\pi/3)$$

$$IW8 = A \cdot \sin(2\omega t + \alpha 31 + 2\pi/3) \quad \text{[Equation 8]}$$

For driving the rotary electric machine 10 in the 8-pole mode, the controller 15 causes the following electrical currents, which are expressed by the following equations 9, to flow through the respective phase windings:

$$IU1 = A \cdot \sin(\omega t + \alpha 32)$$

$$IV1 = A \cdot \sin(\omega t + \alpha 32 + 2\pi/3)$$

$$IW1 = A \cdot \sin(\omega t + \alpha 32 - 2\pi/3)$$

$$IU2 = -A \cdot \sin(\omega t + \alpha 32)$$

$$IV2 = -A \cdot \sin(\omega t + \alpha 32 + 2\pi/3)$$

$$IW2 = -A \cdot \sin(\omega t + \alpha 32 - 2\pi/3)$$

$$IU3 = -A \cdot \sin(\omega t + \alpha 32)$$

$$IV3 = -A \cdot \sin(\omega t + \alpha 32 + 2\pi/3)$$

$$IW3 = -A \cdot \sin(\omega t + \alpha 32 - 2\pi/3)$$

$$IU4 = A \cdot \sin(\omega t + \alpha 32)$$

$$IV4 = A \cdot \sin(\omega t + \alpha 32 + 2\pi/3)$$

$$IW4 = A \cdot \sin(\omega t + \alpha 32 - 2\pi/3)$$

$$IU5 = A \cdot \sin(\omega t + \alpha 32)$$

$$IV5 = A \cdot \sin(\omega t + \alpha 32 + 2\pi/3)$$

$$IW5 = A \cdot \sin(\omega t + \alpha 32 - 2\pi/3)$$

$$IU6 = -A \cdot \sin(\omega t + \alpha 32)$$

$$IV6 = -A \cdot \sin(\omega t + \alpha 32 + 2\pi/3)$$

$$IW6 = -A \cdot \sin(\omega t + \alpha 32 - 2\pi/3)$$

$$IU7 = -A \cdot \sin(\omega t + \alpha 32)$$

$$IV7 = -A \cdot \sin(\omega t + \alpha 32 + 2\pi/3)$$

$$IW7 = -A \cdot \sin(\omega t + \alpha 32 - 2\pi/3)$$

$$IU8 = A \cdot \sin(\omega t + \alpha 32)$$

$$IV8 = A \cdot \sin(\omega t + \alpha 32 + 2\pi/3)$$

$$IW8 = A \cdot \sin(\omega t + \alpha 32 - 2\pi/3) \quad \text{[Equation 9]}$$

For driving the rotary electric machine 10 in the 4-pole mode, the controller 15 causes the following electrical currents, which are expressed by the following equations 10, to flow through the respective phase windings:

$IU1 = A \cdot \sin(\omega t/2 + \alpha 33)$ $IV1 = A \cdot \sin(\omega t/2 + \alpha 33 - 2\pi/3)$ $IW1 = A \cdot \sin(\omega t/2 + \alpha 33 + 2\pi/3)$ $IU2 = -A \cdot \sin(\omega t/2 + \alpha 33)$ $IV2 = -A \cdot \sin(\omega t/2 + \alpha 33 - 2\pi/3)$ $IW2 = -A \cdot \sin(\omega t/2 + \alpha 33 + 2\pi/3)$ $IU3 = A \cdot \sin(\omega t/2 + \alpha 33)$ $IV3 = A \cdot \sin(\omega t/2 + \alpha 33 - 2\pi/3)$ $IW3 = A \cdot \sin(\omega t/2 + \alpha 33 + 2\pi/3)$ $IU4 = -A \cdot \sin(\omega t/2 + \alpha 33)$ $IV4 = -A \cdot \sin(\omega t/2 + \alpha 33 - 2\pi/3)$ $IW4 = -A \cdot \sin(\omega t/2 + \alpha 33 + 2\pi/3)$ $IU5 = -A \cdot \sin(\omega t/2 + \alpha 33)$ $IV5 = -A \cdot \sin(\omega t/2 + \alpha 33 - 2\pi/3)$ $IW5 = -A \cdot \sin(\omega t/2 + \alpha 33 + 2\pi/3)$ $IU6 = A \cdot \sin(\omega t/2 + \alpha 33)$ $IV6 = A \cdot \sin(\omega t/2 + \alpha 33 - 2\pi/3)$ $IW6 = A \cdot \sin(\omega t/2 + \alpha 33 + 2\pi/3)$ $IU7 = -A \cdot \sin(\omega t/2 + \alpha 33)$ $IV7 = -A \cdot \sin(\omega t/2 + \alpha 33 - 2\pi/3)$ $IW7 = -A \cdot \sin(\omega t/2 + \alpha 33 + 2\pi/3)$ $IU8 = A \cdot \sin(\omega t/2 + \alpha 33)$ $IV8 = A \cdot \sin(\omega t/2 + \alpha 33 - 2\pi/3)$ $IW8 = A \cdot \sin(\omega t/2 + \alpha 33 + 2\pi/3)$ [Equation 10]

For driving the rotary electric machine 10 in the 2-pole mode, the controller 15 causes the following electrical currents, which are expressed by the following equations 11, to flow through the respective phase windings:

$IU1 = A \cdot \sin(\omega t/4 + \alpha 34)$ $IV1 = A \cdot \sin(\omega t/4 + \alpha 34 + 2\pi/3)$ $IW1 = A \cdot \sin(\omega t/4 + \alpha 34 - 2\pi/3)$ $IU2 = -A \cdot \sin(\omega t/4 + \alpha 34)$ $IV2 = -A \cdot \sin(\omega t/4 + \alpha 34 + 2\pi/3)$ $IW2 = -A \cdot \sin(\omega t/4 + \alpha 34 - 2\pi/3)$ $IU3 = A \cdot \sin(\omega t/4 + \alpha 34)$ $IV3 = A \cdot \sin(\omega t/4 + \alpha 34 + 2\pi/3)$ $IW3 = A \cdot \sin(\omega t/4 + \alpha 34 - 2\pi/3)$ $IU4 = -A \cdot \sin(\omega t/4 + \alpha 34)$ $IV4 = -A \cdot \sin(\omega t/4 + \alpha 34 + 2\pi/3)$ $IW4 = -A \cdot \sin(\omega t/4 + \alpha 34 - 2\pi/3)$ $IU5 = A \cdot \sin(\omega t/4 + \alpha 34)$ $IV5 = A \cdot \sin(\omega t/4 + \alpha 34 + 2\pi/3)$ $IW5 = A \cdot \sin(\omega t/4 + \alpha 34 - 2\pi/3)$ $IU6 = -A \cdot \sin(\omega t/4 + \alpha 34)$ $IV6 = -A \cdot \sin(\omega t/4 + \alpha 34 + 2\pi/3)$ $IW6 = -A \cdot \sin(\omega t/4 + \alpha 34 - 2\pi/3)$ $IU7 = A \cdot \sin(\omega t/4 + \alpha 34)$ $IV7 = A \cdot \sin(\omega t/4 + \alpha 34 + 2\pi/3)$ $IW7 = A \cdot \sin(\omega t/4 + \alpha 34 - 2\pi/3)$ $IU8 = -A \cdot \sin(\omega t/4 + \alpha 34)$ $IV8 = -A \cdot \sin(\omega t/4 + \alpha 34 + 2\pi/3)$ $IW8 = -A \cdot \sin(\omega t/4 + \alpha 34 - 2\pi/3)$ [Equation 11]

Here, a supplementary description of the energization control in each pole number mode is provided. In the 16-pole mode, as can be understood from Equation 8 above, the controller 15 causes the directions of the energization currents of each group and each phase to all be identical. As a result, as shown in FIG. 30, the energization directions of the two groups of phase windings in the same slot become identical in the single-group slots and all of the mixed-group slots, and the number of poles of the rotary electric machine 10 becomes a maximum value (16 poles).

Furthermore, in the 8-pole mode, as can be understood from Equation 9 above, the controller 15 reverses, among the energization currents of each group and each phase, the direction of the energization currents of the second group, the third group, the sixth group, and the seventh group (IU2, IV2, IW2, IU3, IV3, IW3, IU6, IV6, IW6, IU7, IV7, and IW7). In this case, for example, among the U1-U2, U2-U3, U3-U4, U4-U5, U5-U6, U6-U7, and U7-U8 combinations of phase windings in the U-phase mixed-group slots, the energization directions become identical for the U2-U3, U4-U5, and U6-U7 combinations, and the energization directions are mutually opposing for all other combinations. As a result, as shown in FIG. 31, the energization directions of the two groups of phase windings in the same slot become identical in the single-group slots and some of the mixed-group slots (mixed-group slots which are combinations of the second and third groups, the fourth and fifth groups, and the sixth and seventh groups), and the number of poles of the rotary electric machine 10 becomes 8 poles.

Furthermore, in the 4-pole mode, as can be understood from Equation 10 above, the controller 15 reverses, among the energization currents of each group and each phase, the direction of the energization currents of the second group, the fourth group, the fifth group, and the seventh group (IU2, IV2, IW2, IU4, IV4, IW4, IU5, IV5, IW5, IU7, IV7, and IW7). In this case, for example, among the U1-U2, U2-U3, U3-U4, U4-U5, U5-U6, U6-U7, and U7-U8 combinations of phase windings in the U-phase mixed-group slots, the energization directions become identical for the U4-U5 combination, and the energization directions are mutually opposing for all other combinations. As a result, as shown in FIG. 32, the energization directions of the two groups of phase windings in the same slot become identical in the single-group slots and some of the mixed-group slots (mixed-group slots which are combinations of the fourth and fifth groups), and the number of poles of the rotary electric machine 10 becomes 4 poles.

Furthermore, in the 2-pole mode, as can be understood from Equation 11 above, the controller 15 reverses, among the energization currents of each group and each phase, the direction of the energization currents of the second group, the fourth group, the sixth group, and the eighth group (IU2, IV2, IW2, IU4, IV4, IW4, IU6, IV6, IW6, IU8, IV8, and IW8). In this case, for example, the energization directions are mutually opposing for the U1-U2, U2-U3, U3-U4, U4-U5, U5-U6, U6-U7, and U7-U8 combinations of phase windings in the U-phase mixed-group slots. As a result, as shown in FIG. 33, the energization directions of the two groups of phase windings in the same slot become identical in only the single-group slots, and the number of poles of the rotary electric machine 10 becomes 2 poles.

In other words, as shown in FIG. 30 to FIG. 33, the controller 15 selectively executes, at the time of energization of the phase windings, a first task (see FIG. 31 and FIG. 32) which causes the energization directions of the phase windings in some of the mixed-group slots to become different, and a second task (see FIG. 33) which causes the energization directions of the phase windings in all of the mixed-group slots to become different.

According to the above configuration of the present embodiment, the two groups of phase windings accommodated in the mixed-group slots represent seven different types of combinations for each phase. In this case, by using the mixed-group slots having seven types of combinations for each phase, and appropriately energizing the mixed-group slots, an advantageous configuration can be realized when implementing a pole number ratio having multiple levels.

Modifications

The embodiments above may, for example, be modified as follows.

Figure 34:
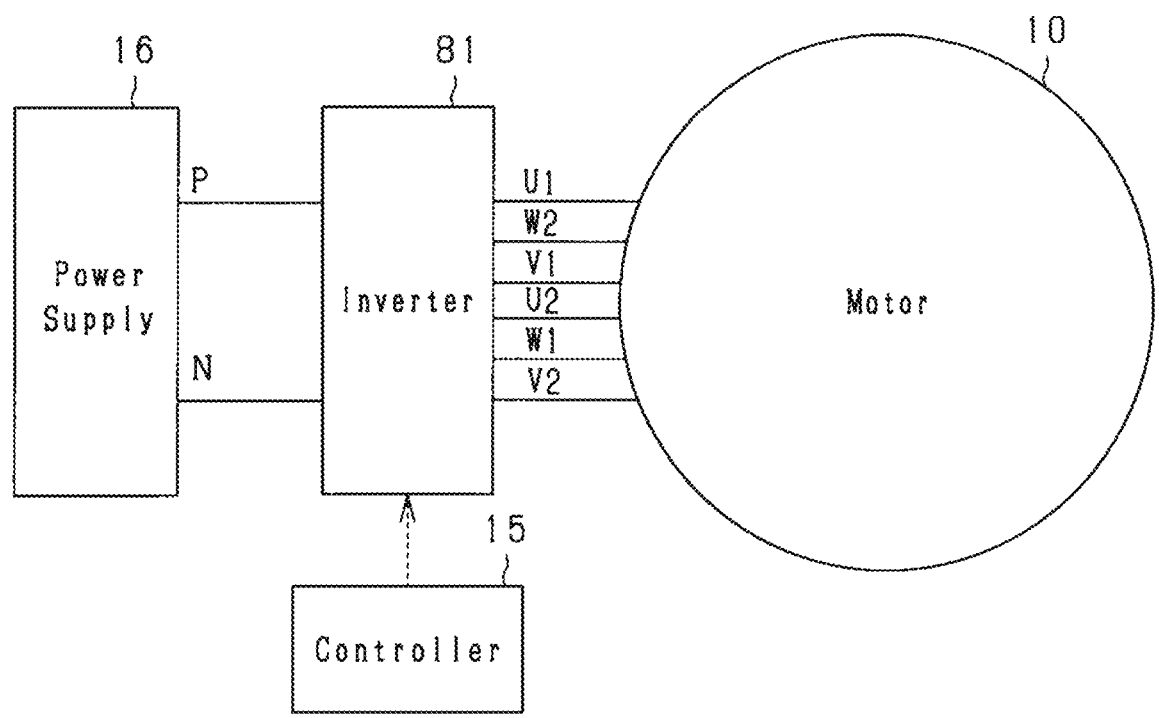
FIG. 34 is an overall configuration diagram of another form of a rotary electric machine system.

For example, in the configuration in FIG. 1, the stator windings 11 and 12 (two groups of phase windings) are respectively configured to be connected to the three-phase inverters 13 and 14, but this may be modified. For example, as shown in FIG. 34, a configuration may be implemented in which the stator windings 11 and 12 (two groups of phase windings) are connected to a six-phase inverter 81.

In the embodiments described above, the groups of phase windings are arranged on the radially inner side and the radially outer side inside the slots 34, but it is not limited to this, and a configuration may be implemented in which the groups of phase windings are provided by being arranged in the circumferential direction inside the slots 34.

Figure 35:
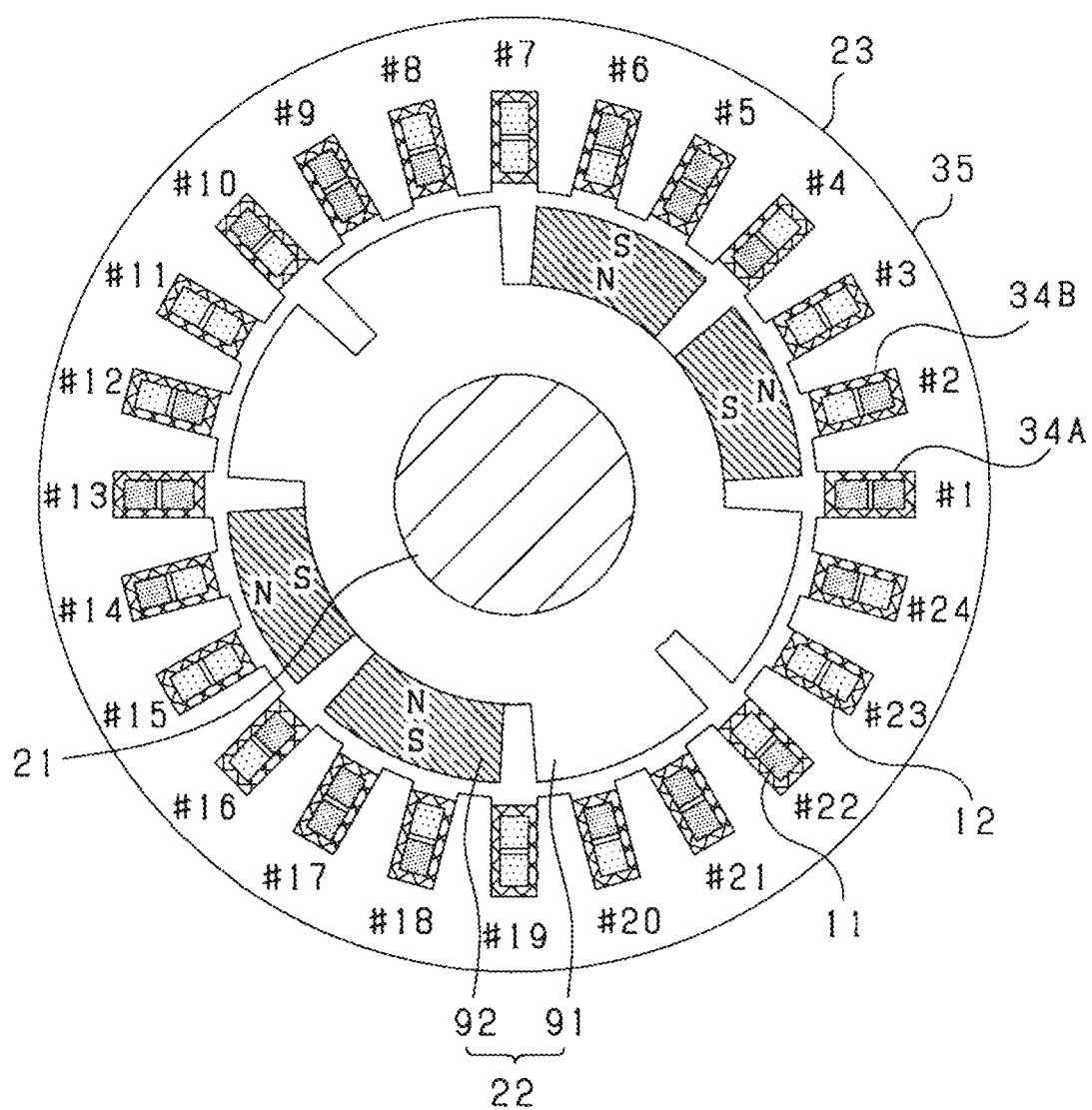
FIG. 35 is a diagram showing another form of a rotary electric machine.

In the rotary electric machine 10, the rotor 22 may be configured by a rotor that uses a permanent magnet. FIG. 35 shows an example in which the inductor-type rotor in FIG. 4 has been replaced by a permanent magnet-type rotor. In this case, the rotor 22 is configured by a rotor core 91, and permanent magnets 92 provided on an outer circumferential portion of the rotor core 91. In the rotor 22, fixed magnetic poles of the permanent magnets 92 and a magnetic pole of the rotor core 91 are arranged in the circumferential direction, and the number of poles of the rotor 22 is switched by reversing the polarity of the magnetic pole of the rotor core 91 in response to a stator magnetomotive force. As a result of using the permanent magnets 92, because the rotor magnetic pole can be configured without an electromagnet that includes a secondary conductor, loss reduction is achieved with respect to the rotor 22, and the efficiency of the rotary electric machine 10 can be increased. Furthermore, the cooling function can be simplified, and the physical size can be made smaller.

The present disclosure has been described based on the embodiments, however, it is to be understood that the present disclosure is not limited to these embodiments and constructions. The present disclosure also includes various modifications and equivalent variations. In addition, the various combinations and configurations, and other combinations and configurations including more, less, or only a single element, are also within the scope and spirit of the present disclosure.

What is claimed is:

1. A rotary electric machine comprising:
a rotor; and
a stator comprising:
stator windings including n groups of three-phase windings, where n is a power of 2; and
a plurality of slots with the stator windings wound therein, the slots being provided in a circumferential direction of the stator and including:
first slots that each only accommodate portions of same-group and same-phase windings in the n groups of three-phase windings, energizing directions of the same-group and same-phase windings being identical to each other; and
second slots each accommodating different-group and same-phase windings in the n groups of three-phase windings;
wherein the first slots and the second slots are arranged in the stator at predetermined intervals in a circumferential direction of the stator,
the three-phase windings of each group are wound around the stator with regular intervals therebetween, and
a number of poles of the rotary electric machine is configured to be changeable.

2. The rotary electric machine according to claim 1, wherein:
the first slots respectively for different groups in the n groups are arranged at intervals of m slots in the circumferential direction of the stator; and
(m−1) second slots are each arranged between a corresponding pair of the first slots of the different groups.

3. The rotary electric machine according to claim 1, wherein:
each of the second slots accommodates a same number of the different-group and same-phase windings for each of the different groups.

4. The rotary electric machine according to claim 1, wherein
the stator windings include $2^{(A-1)}$ groups of phase windings as the n groups of phase windings;
the second slots include slots, each of the slots accommodating a unique combination of two groups of phase windings selected from the $2^{(A-1)}$ groups of phase windings; and
the number of poles of the rotary electric machine is configured to be changeable in the A steps.

5. The rotary electric machine according to claim 1, wherein:
the n groups of phase windings are comprised of a first group to an nth group of phase windings; and the second slots include slots that accommodate, for each phase, (n−1) types of combinations of any two-different group windings selected from the first group to the nth group.

6. A rotary electric machine system comprising:

the rotary electric machine according to claim 1; and a computer configured to control energization of each of the phase windings in the rotary electric machine, the computer being configured to:
- perform energization of each of the different-phase and same-group windings accommodated in a corresponding one of the second slots such that energization directions of the respective different-phase and same-group windings are identical to each other;
- perform energization of each of the different-phase and same-group windings accommodated in a corresponding one of the second slots such that energization directions of the respective different-phase and same-group windings are different from each other; and
- switch between energization of each of the different-phase and same-group windings in identical energization directions, and energization of the each of the different-phase and same-group windings in different energization directions.

7. The rotary electric machine system according to claim 6, wherein:

the second slots in the rotary electric machine include slots, each of the slots accommodating a unique combination of two groups of phase windings selected from the n groups of phase windings; and the computer is configured to selectively perform:
- a first operation that causes energization directions of the phase windings disposed in at least one of the second slots among all of the second slots to be different from each other; and
- a second task that causes energization directions of the phase windings in all of the second slots to be different from each other.

8. The rotary electric machine system according to claim 6, wherein the computer is configured to:

perform control of the energization of each of the different-phase and same-group windings accommodated in a corresponding one of the second slots using a predetermined first number X1 of poles of the rotary electric machine; and when performing control of the energization of each of the different-phase and same-group windings accommodated in a corresponding one of the second slots using a predetermined second number X2 of poles of the rotary electric machine, set an energization frequency for each of the different-phase and same-group windings to a value of 1/B, the second number X2 being expressed by the following equation:

$$X2 = X1/B$$

9. The rotary electric machine system according to claim 6, further comprising:

power converters provided for the respective n groups of phase windings, wherein the computer is configured to cause each of the power converters to perform power conversion to accordingly control energization of each of the stator windings included in a corresponding one of the second slots.

\* \* \* \* \*